(12) United States Patent
Farås et al.

(10) Patent No.: US 11,145,072 B2
(45) Date of Patent: Oct. 12, 2021

(54) METHODS, DEVICES AND COMPUTER PROGRAM PRODUCTS FOR 3D MAPPING AND POSE ESTIMATION OF 3D IMAGES

(71) Applicant: SONY GROUP CORPORATION, Tokyo (JP)

(72) Inventors: Sebastian Farås, Malmö (SE); Mattias Walls, Häljarp (SE); Francesco Michielin, Stuttgart (DE); Bo-Erik Månsson, Bjärred (SE); Johannes Elg, Helsingborg (SE); Fredrik Mattisson, Lund (SE); Lars Novak, Bjärred (SE); Fredrik Olofsson, Lund (SE); Sebastian Haner, Lund (SE); Roderick Köhle, Munich (DE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/634,836

(22) PCT Filed: Aug. 31, 2017

(86) PCT No.: PCT/US2017/049575
§ 371 (c)(1),
(2) Date: Jan. 28, 2020

(87) PCT Pub. No.: WO2019/045722
PCT Pub. Date: Mar. 7, 2019

(65) Prior Publication Data
US 2021/0118160 A1    Apr. 22, 2021

(51) Int. Cl.
*G06T 7/55*    (2017.01)
*G06T 7/80*    (2017.01)
(Continued)

(52) U.S. Cl.
CPC .............. *G06T 7/55* (2017.01); *G06T 7/73* (2017.01); *G06T 7/80* (2017.01); *G06T 17/00* (2013.01);
(Continued)

(58) Field of Classification Search
CPC ...... A63F 13/25; A63F 13/50; A63F 13/5378; G06K 9/00476; G06K 9/46; G06K 9/468;
(Continued)

(56) References Cited

U.S. PATENT DOCUMENTS 10,254,118 B2 * 4/2019 Roumeliotis ............... B25J 5/00
10,453,249 B2 * 10/2019 Smirnov .................. G06T 5/001
(Continued)

OTHER PUBLICATIONS

Christopher M. Bishop. Section 5.3 "Error Backpropagation" from Pattern Recognition and Machine Learning (Information Science and Statistics). Springer-Verlag New York, Inc., Secaucus, NJ, USA, 2006. pp. Cover, copyright, 241-249.
(Continued)

*Primary Examiner* — Ming Wu
(74) *Attorney, Agent, or Firm* — Myers Bigel, P.A.

(57) ABSTRACT

A method for estimating a 3D map and a plurality of poses is described. The method includes non-recursively performing an initialization of the 3D map and the respective poses of the plurality of poses based on a plurality of first 2D images of the series of 2D images, and recursively performing sequential updating of the 3D map based on recursively updating the 3D map for respective ones of a plurality of second 2D images of the series of 2D images. Related systems, devices and computer program products are also described.

14 Claims, 20 Drawing Sheets

(51) Int. Cl.
*G06T 7/73* (2017.01)
*G06T 17/00* (2006.01)

(52) U.S. Cl.
CPC .............. *G06T 2207/10016* (2013.01); *G06T 2207/20076* (2013.01); *G06T 2207/30244* (2013.01)

(58) Field of Classification Search
CPC .......... G06K 9/52; G06T 15/10; G06T 17/05; G06T 19/006; G06T 2200/08; G06T 2207/10012; G06T 2207/10016; G06T 2207/20021; G06T 2207/30244; G06T 2215/16; G06T 2219/2004; G06T 7/0008; G06T 7/13; G06T 7/246; G06T 7/337; G06T 7/55; G06T 7/73; G06T 7/74; H04N 13/207; H04N 13/211; H04N 7/18
See application file for complete search history.

(56) References Cited

U.S. PATENT DOCUMENTS

| | | | |
|---|---|---|---|
| 2015/0172626 A1 | 6/2015 | Martini | |
| 2018/0144458 A1* | 5/2018 | Xu | G06T 7/70 |
| 2018/0197331 A1* | 7/2018 | Chen | G06F 30/20 |
| 2018/0315232 A1* | 11/2018 | Jones | G06T 15/005 |

OTHER PUBLICATIONS

Richard Hartley and Andrew Zisserman. Multiple View Geometry in Computer Vision, Second Edition. Cambridge University Press, New York, NY, USA, 2003, Cover, copyright, pp. 458-501, 515-532.

International Search Report and Written Opinion of the International Searching Authority, International Application No. PCT/US2017/049575, dated Nov. 7, 2017, 14 pp.

Strewlow et al., "Motion Estimation from Image and Inertial Measurements", The International Journal of Robotics Research, vol. 23, No. 12, Dec. 2004, pp. 1157-1195.

Deans et al., "Experimental comparison of techniques for localization and mapping using a bearing-only sensor", Proceedings of the ISER '00 Seventh International Symposium on Experimental Robotics, Dec. 1, 2000, 10 pp.

Civera et al., "Camera Self-Calibration for Sequential Bayesian Structure From Motion", 2009 IEEE International Conference on Robotics and Automation, Kobe International Conference Center, Kobe Japan, May 12-17, 2009, pp. 403-408.

Heyden et al., "Euclidean Reconstruction from Image Sequences with Varying and Unknown Focal Length and Principal Point", Proceedings of the IEEE Computer Society Conference on Computer Vision and Pattern Recognition, San Juan, Puerto Rico, Jun. 17-19, 1997, pp. 438-443.

Klein et al., "Parallel Tracking and Mapping for Small AR Workspaces", 2007 6th IEEE and ACM International Symposium on Mixed and Augmented Reality, Nara, Japan, Nov. 13-16, 2007, 10 pp.

Klein et al., "Parallel Tracking and Mapping on a Camera Phone", IEEE International Symposium on Mixed and Augmented Reality 2009 Science and Technology Proceedings, Orlando, Florida, Oct. 19-22, 2009, pp. 83-86.

Pollefeys et al, "Self-calibration and Metric Reconstruction in spite of Varying and Unknown Internal Camera Parameters", Sixth International Conference on Computer Vision, Bombay, India, Jan. 7, 1998, pp. 90-92.

Pollefeys et al, "Self-calibration and Metric Reconstruction in spite of Varying and Unknown Intrinsic Camera Parameters", International Journal of Computer Vision, Apr. 1998, 18 pp.

\* cited by examiner

METHODS, DEVICES AND COMPUTER PROGRAM PRODUCTS FOR 3D MAPPING AND POSE ESTIMATION OF 3D IMAGES

CROSS REFERENCE TO RELATED APPLICATION

This application is a 35 U.S.C. § 371 national stage application of PCT International Application No. PCT/US2017/049575, filed on Aug. 31, 2017, the content of which is incorporated herein by reference in its entirety. The above-referenced PCT International Application was published in the English language as International Publication No. WO 2019/045722 A1 on Mar. 7, 2019.

FIELD

Various embodiments described herein relate to methods and devices for image processing and more particularly to creating 3D images.

BACKGROUND

Simultaneous Localization and Mapping (SLAM) relates to constructing or updating a map or an image while a user's location is non-static in the environment. In mono-camera systems, image-based positioning algorithms may use SLAM techniques to create three-dimensional (3D) images for augmented reality, 3D printing, 3D model development, and other applications. An important part of using SLAM techniques the initialization construction of a 3D map from Two-Dimensional (2D) images. SLAM techniques can generate a 3D map from a series of 2D images, which can allow the generation of a 3D model from a series of scanned images. Developing a 3D map may be based on various poses of the object in the 2D images, which may be a challenging, computationally intensive task.

SUMMARY

Various embodiments described herein provide a method for estimation of a Three-Dimensional, 3D, map and a plurality of poses from a series of Two-Dimensional (2D) images. The method includes non-recursively performing an initialization of the 3D map and the respective poses of the plurality of poses based on a plurality of first 2D images of the series of 2D images, and recursively performing sequential updating of the 3D map based on recursively updating the 3D map for respective ones of a plurality of second 2D images of the series of 2D images.

According to various embodiments, the method may include non-recursively determining respective poses of the plurality of poses for respective ones of the plurality of second 2D images of the series of 2D images. A respective pose may be associated with a respective one of the plurality of the first 2D images or with a respective one of the plurality of the second 2D images. A pose of the plurality of poses may include an orientation and a position of capture of the respective one of the plurality of first 2D images or the plurality of second 2D images.

According to various embodiments, the series of 2D images may include a first scan. The non-recursively performing the initialization of the 3D map may include calibrating intrinsic parameters associated with a camera used to capture the plurality of first 2D images of the series of 2D images based on the plurality of first 2D images and a baseline of intrinsic parameters associated with a previous estimation that occurred before the first scan.

According to various embodiments, non-recursively performing the initialization of the 3D map may include selectively determining that a 2D image of the plurality of first 2D images is a key frame of a plurality of key frames. Selectively determining that the 2D image of the plurality of first 2D images is the key frame may include determining that the 2D image of the plurality of first 2D images is the key frame, responsive to a change in a pose from another 2D image of the plurality of first 2D images being greater than a threshold. Non-recursively performing the initialization of the 3D map further may include performing bundle adjustment on the plurality of key frames of the plurality of first 2D images of the series of 2D images to update the 3D map and to update the plurality of poses.

According to various embodiments, Non-recursively performing the initialization of the 3D map may include identifying one or more landmarks in the 3D map. Recursively performing sequential updating of the 3D map may include recursively updating the 3D map based on the one or more landmarks that were identified during the non-recursively performing the initialization. Recursively updating the 3D map may include updating existing 3D points in the 3D map and adding new 3D points to the 3D map based on the plurality of second 2D images.

According to various embodiments, the series of 2D images may include a first scan. The method may further include recursively calibrating intrinsic parameters associated with a camera used to capture the plurality of second 2D images based on recursively estimating intrinsic parameters based on both the plurality of first 2D images and the plurality of second 2D images that are in the first scan. Recursively estimating intrinsic parameters may include applying a recursive Bayesian approach to the recursively estimating intrinsic parameters. A joint distribution of a set of 3D points in the 3D map and the plurality of poses may include a uniform distribution. Recursively estimating intrinsic parameters may include estimating a mean of the joint distribution of the set of 3D points in the 3D map and the plurality of poses, estimating a covariance of the joint distribution of the set of 3D points in the 3D map and the plurality of poses, and deriving a distribution of the intrinsic parameters based on marginalization over the joint distribution of the set of 3D points in the 3D map and the plurality of poses. The method may include using the mean of the joint distribution as an estimate of second intrinsic parameters for estimation of the 3D map and the plurality of poses based on a second scan that occurs after the first scan.

According to various embodiments, a computer program product for operating an image capturing system, the computer program product comprising a non-transitory computer readable storage medium having computer readable program code embodied in the medium that when executed by a processor causes the processor to perform the method of any the above described steps.

Various embodiments described herein can provide an image processing system for processing images. The image processing system includes a processor and a memory coupled to the processor and storing computer readable program code that when executed by the processor causes the processor to perform operations including non-recursively performing an initialization of the 3D map and the respective poses of the plurality of poses based on a plurality of first 2D images of the series of 2D images, and recursively performing sequential updating of the 3D map based on recursively updating the 3D map for respective ones of a plurality of second 2D images of the series of 2D images.

Various embodiments described herein provide a method for estimation of a Three-Dimensional, 3D, map and a plurality of poses from a series of 2D images. The series of 2D images includes a first scan. The method includes non-recursively performing an initialization of the 3D map and the respective poses of the plurality of poses based on a plurality of first 2D images of the series of 2D images, recursively performing sequential updating of the 3D map based on recursively updating the 3D map for respective ones of a plurality of second 2D images of the series of 2D images, and calibrating intrinsic parameters associated with a camera used to capture the plurality of first 2D images of the series of 2D images based on the plurality of first 2D images and a baseline of intrinsic parameters associated with a previous estimation that occurred before the first scan.

Various embodiments described herein provide a method for estimation of a Three-Dimensional, 3D, map and a plurality of poses from a series of 2D images. The series of 2D images includes a first scan. The method includes non-recursively performing an initialization of the 3D map and the respective poses of the plurality of poses based on a plurality of first 2D images of the series of 2D images, recursively performing sequential updating of the 3D map based on recursively updating the 3D map for respective ones of a plurality of second 2D images of the series of 2D images, and recursively calibrating intrinsic parameters associated with a camera used to capture the plurality of second 2D images based on recursively estimating intrinsic parameters based on both the plurality of first 2D images and the plurality of second 2D images that are in the first scan.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

DETAILED DESCRIPTION

Figure 1:
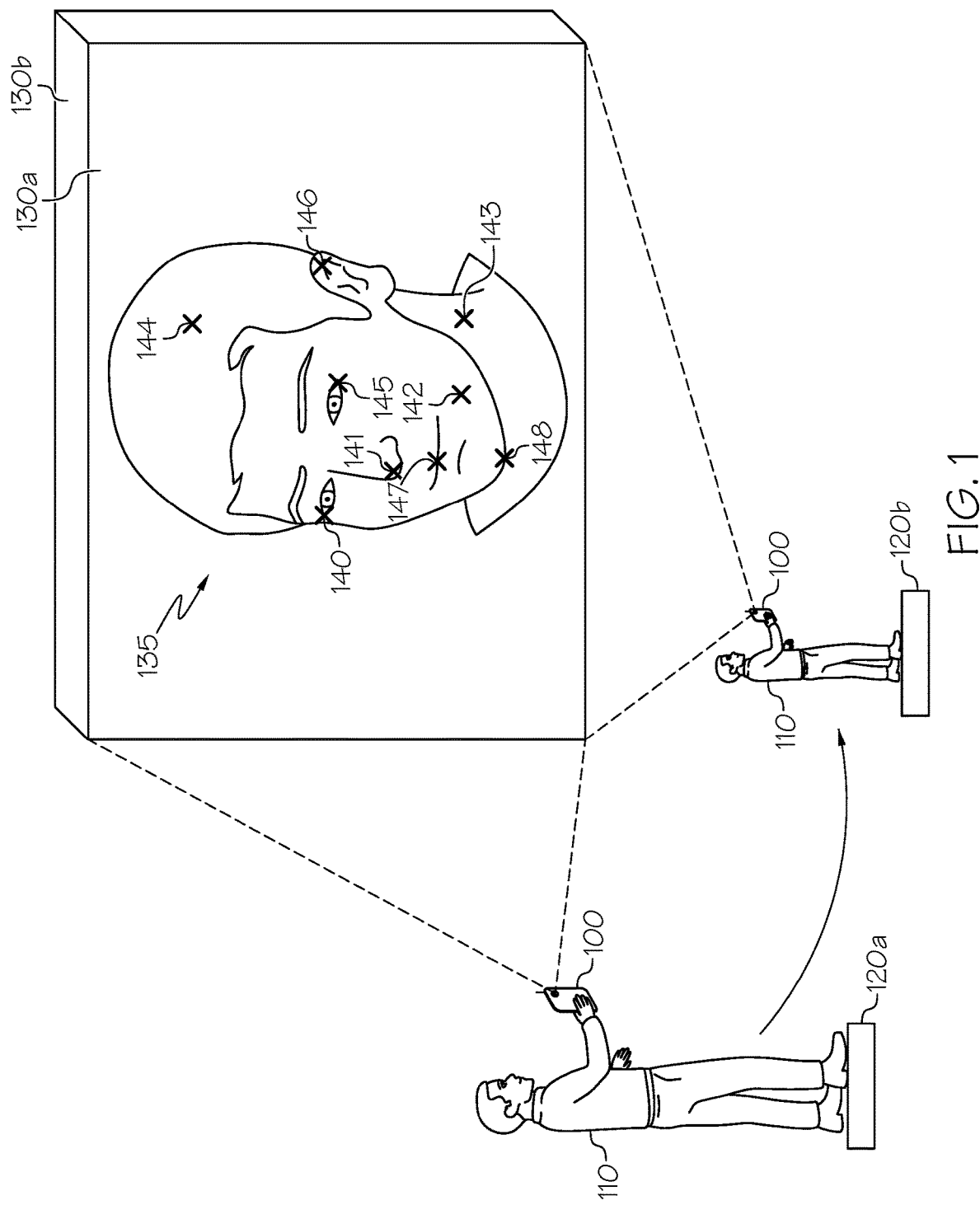
FIG. 1 illustrates a user taking pictures with a camera, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Applications such as 3D imaging, mapping, and navigation may use Simultaneous Localization and Mapping (SLAM). SLAM relates to constructing or updating a map of an unknown environment while simultaneously keeping track of an object's location within it and/or estimating the pose of the camera with respect to the object or scene. This computational problem is complex since the object may be moving and the environment may be changing. 2D images of real objects and/or 3D object may be captured with the objective of creating a 3D image that is used in real-world applications such as augmented reality, 3D printing, and/or 3D visualization with different perspectives of the real objects. The 3D objects may be characterized by features that are specific locations on the physical object in the 2D images that are of importance for the 3D representation such as corners, edges, center points, or object-specific features on a physical object such as a face that may include nose, ears, eyes, mouth, etc. There are several algorithms used for solving this computational problem associated with 3D imaging, using approximations in tractable time for certain environments. Popular approximate solution methods include the particle filter and Extended Kalman Filter (EKF). The particle filter, also known as a Sequential Monte Carlo (SMC) linearizes probabilistic estimates of data points. The Extended Kalman Filter is used in non-linear state estimation in applications including navigation systems such as Global Positioning Systems (GPS), self-driving cars, unmanned aerial vehicles, autonomous underwater vehicles, planetary rovers, newly emerging domestic robots, medical devices inside the human body, and/or image processing systems. Image processing systems may perform 3D pose estimation using SLAM techniques by performing a transformation of an object in a 2D image to produce a 3D object. However, existing techniques such as SMC and EKF may be insufficient in accurately estimating and positioning various points in a 3D object based on information discerned from 2D objects and may be computationally inefficient in real time.

Various embodiments described herein may arise from a recognition that accurately estimating various points in a 3D map and accurate 3D pose estimation are essential to 3D image generation. According to various embodiments described herein, the underlying feature-based simultaneous localization and mapping (SLAM) system used for camera pose estimation addresses two main problems: 1) deliver real-time localization information for sequential 3D reconstruction and 2) perform an estimation of the several intrinsic parameters which are used to describe the camera model. Calibration of the intrinsic parameters may be needed for each individual camera in order to reach the desired accuracy in the pose estimates. Techniques based on Bayesian estimation theory are described here to automatically calibrate the camera model in the background while the user is scanning. Furthermore, a 3D map is estimated and updated based on various embodiments described herein.

In recent years, there have been many proposed SLAM solutions capable of running on mobile phones. The Klein and Murray PTAM approach, Parallel Tracking and Mapping for Small AR Workspaces (ISMAR'07, Nara) and Parallel Tracking and Mapping on a Camera Phone (ISMAR'09, Orlando), is well-known to the community. Unfortunately, the Klein and Murray system is not fully recursive since the previous estimated camera positions are continuously refined by using Bundle Adjustment (BA) techniques. The lack of causality may be damaging in a real time 3D reconstruction system since the already reconstructed results may be invalid after a non-linear transformation of the previous camera positions. On the other hand, a fully recursive system, without bundle adjustment, may not be accurate enough for the 3D reconstruction and the camera calibration problem.

Structure from motion (SfM) problems are often solved in legacy systems with pre-calibrated camera model parameters. Common techniques for calibration use data from images of objects with known structure or patterns in the texture, such as, for example, chess boards with pre-measured geometry of the squares. Some calibration techniques rely on prior knowledge about the movement of the camera. Such techniques may require extra manual work to acquire the images and computing and other resources. A user of a 3D image creation system may not have the time or resources to perform the aforementioned tasks or may not have access to a specially designed chess board with a known pattern that could be included in the image capture. Moreover, pre-calibration may not be precise enough due to factory-tolerances and/or may vary over time since the lens and image sensor alignment may change after a phone bump, heating, etc. As described herein, autocalibration techniques are described that can avoid the use of special structures, textured patterns, or movements to determine camera parameters.

Autocalibration based on bundle adjustment has been used in some legacy systems. However, legacy implementations for various different camera models perform image reconstruction by solving for unknown intrinsic camera parameters by assuming zero distortion, even in cases where the focal length varies between the frames that are captured 2D images.

2D images may be obtained using image sensors. Image sensors may be collocated with or integrated with a camera, such as a camera in a mobile device. The terms "image capturing system" and "camera" will be used herein interchangeably. The image capture system may include an image sensor and/or camera optical elements. The image capture system may be implemented with integrated hardware and/or software as part of an electronic device, or as a separate device. Types of image capture systems may include mobile phone cameras, security cameras, wide-angle cameras, narrow-angle cameras, and/or monoscopic cameras.

FIG. 1 illustrates a user taking pictures with a camera at various locations around the object. Although the foregoing examples discuss the images acquired from a camera, the images that are processed may be previously residing in memory or the images be sent to the processing unit for processing according to various embodiments described herein. Furthermore, a face of a person is discussed herein as an example object, but the techniques described herein may apply to any object for which a 2D image can be acquired. Referring now to FIG. 1, a user 110 has a camera 100 for which that they initiate a photographic session of an object 135, such as a person's face, at location 120a. Relative movement between the camera 100 and the object 135 takes place. In some embodiments, the user 110 may physically move around the object 135 to various locations such as from location 120a to location 120b. In other embodiments, the camera may not move and the object may move. In still other embodiments, both the camera and the object may move. Accordingly, as described herein, movement of a camera around an object shall encompass any relative movement between the camera and the object. An image 130 of object 135 is captured at each location. For example, image 130a is captured when the camera 100 is at location 120a and image 130b is captured when camera 100 moves to location 120b. Each of the captured images may be 2D images. There may be a continuous flow of images from the camera as the user walks around the object 135 that is being photographed to capture images at various angles. Once at least two images, such as images 130a and 130b are captured, the images may be processed by a processor in camera 100 and/or a processor external to the camera 100 to produce a 3D map, a 3D representation, and/or a 3D image. Generation of the 3D map may occur after at least the first two images are captured. The quality of the 3D map may not be satisfactory if too few 2D images are used. If the quality of the 3D map is not sufficient, further processing of additional images may take place. In other words, additional 3D points based on information from additional 2D images may improve the quality of the 3D map. Information from the 3D points may be used to determine one or more poses that include orientation and a position of capture information. The 3D map and/or the poses may be subsequently used to generate a 3D image that is provided for display on a display device and/or screen and/or for other purposes such as augmented reality, 3D printing, etc.

The images may be processed by identifying features or landmarks on the object 135 that were captured in the first image 130a and/or second image 130b. The landmarks may be various edges, corners, blobs, or other points on object 135 or object-specific features such as eyes 140, 145, nose 141, dimple 142, neck 143, hair 144, ear 146, mouth 147, and/or chin 148. The features or landmarks may be recognizable locations on the physical object that are tracked in various images of the physical object. When the user 110 moves the camera 100 to a different location 120b, another image 130b is captured. This same process of capturing images and identifying features or landmarks may occur on the order of tens, hundreds, or thousands of times in the context of creating a 3D image. The same features 140 through 148 may be identified in the second image 130b. An X-Y-Z coordinate system may be used to quantify the location of features 140 through 148. Continuing with the foregoing example of a person's face, differences in the facial features and/or facial orientation will be discussed with respect to FIGS. 3A to 3B.

Figure 2:
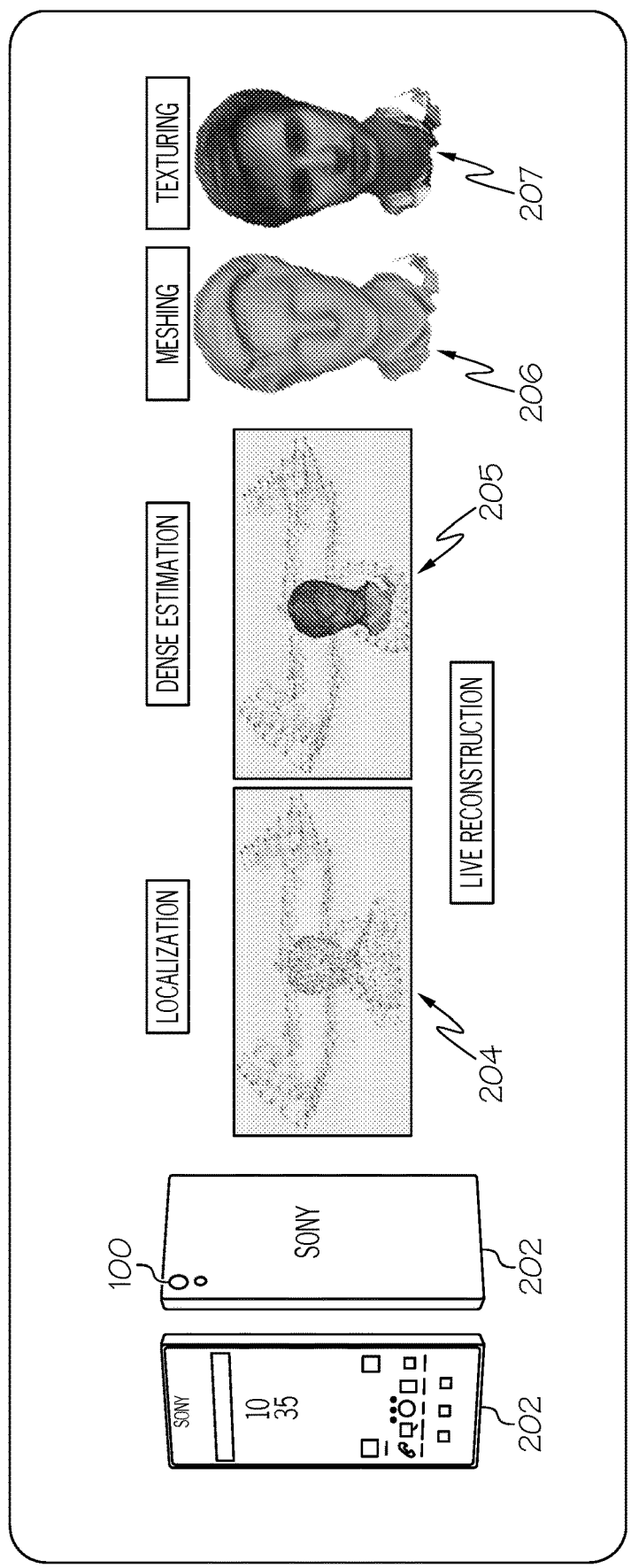
FIG. 2 illustrates image processing of 2D images from a camera, according to various embodiments described herein.

FIG. 2 illustrates image processing of 2D images from a camera to create a 3D image. Referring now to FIG. 2, a camera 100 that is part of a device 202 such as a mobile phone may capture 2D images. Converting 2D images into a 3D representation (also referred to herein as a 3D model) includes multiple, somewhat independent image processing operations, including localization 204, dense estimation 205, meshing 206, and/or texturing 207. Localization 204 may include 3D map and/or depth determination and pose determination. Pose determination may utilize Simultaneous Localization and Mapping (SLAM), including image-based positioning techniques, to track a location (including position and orientation) of the image capture device in an operating environment. 3D map determination may involve calculation of 3D coordinates or related information (e.g., X, Y, and/or Z coordinates) from a set of 2D images by identifying matching elements in two or more images and triangulating the positions of the matched elements in 3D space. Multiple depth maps can be combined in meshing 206 to create an initial polygon mesh representation of a subject represented in the set of images. Meshing 206 may include sculpting to subdivide surfaces of the initial polygon mesh representation to derive adjusted locations and/or displacements for the vertex positions of some polygons, and storing the adjusted locations and/or displacements in an image map. The values of respective vertices of those polygons may thus be adjusted from their initial value, such that the sculpted model may iteratively define portions with an adjusted topology (representing additional detail) relative to the initial or previous polygon mesh representation. That is, after sculpting, the mesh representation may include vertices whose values have changed from the initial value, and vertices whose values have not changed from the initial value. Texturing and other material application operations may involve applying colors from the original set of images to the 3D mesh representation, for example, by projecting the images onto the mesh and/or segments thereof. Operations for creating a 3D representation, such as those described above, may be collectively referred to herein as 3D scanning.

A scan may be based on the camera making a continuous movement around an object. The camera may move continuously around the object that it is capturing, thereby generating several frames or 2D images. The camera motion may include several camera poses. Each of the 2D images has a pose associated with it, which includes the orientation and position of capture by the camera of the 2D image. The position of the pose associated with a given 2D image may be in relation to the first image captured by the camera during the scan. For example, the first 2D image may be designated as having a position in a 3D space as being X coordinate=0, Y coordinate=0, and Z coordinate=0 and the orientation as being zero degrees from the normal from the object to the camera. Subsequent 2D images may have an orientation and position that is with respect to this first 2D image that was captured during the scan. Other techniques of defining the orientation and/or position of an image capturing device may also be used.

Figure 3A:
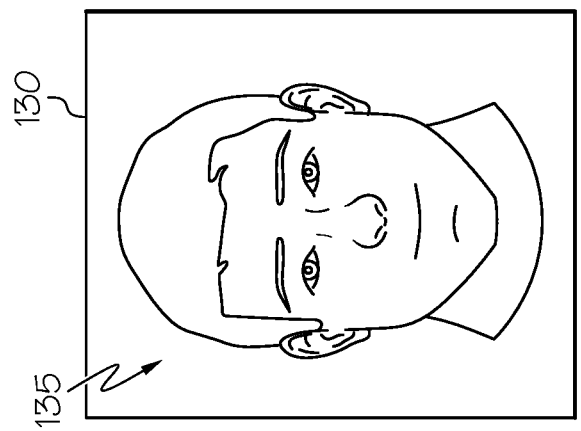
FIGS. 3A to 3C illustrate Two Dimensional (2D) images of a face, according to various embodiments described herein.
Figure 3B:
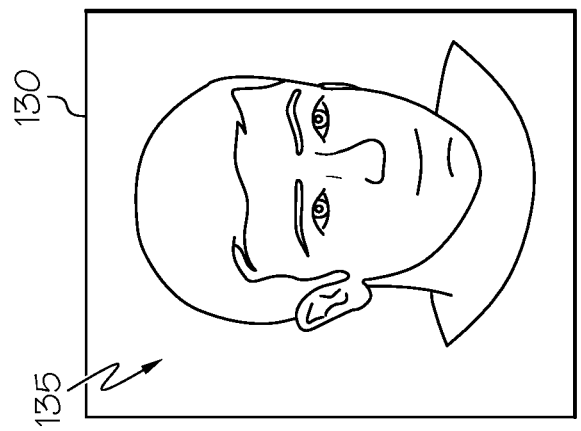
Figure 3C:
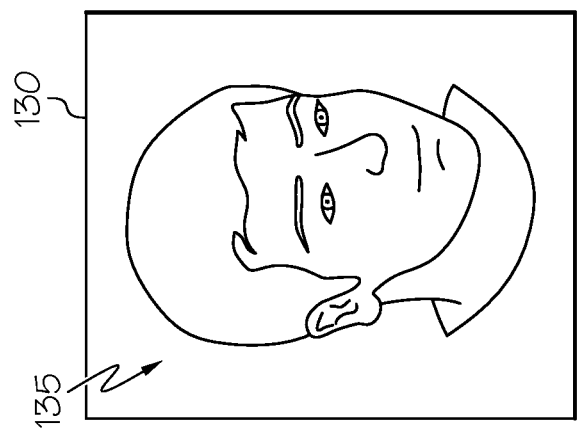

FIGS. 3A to 3C illustrate a person's face that is oriented in various directions. In other words, various poses are illustrated in FIG. 3A to 3C. Referring now to FIG. 3A, the face is oriented straight at the camera. Referring now to FIG. 3B, the face is offset from the perpendicular by about 30 degrees. Referring now to FIG. 3C, the face is offset from the perpendicular by about 45 degrees. Techniques to determine the pose of these various facial angular orientations of the 2D images will now be discussed.

Localization 204 of FIG. 2 is used to determine a 3D map and/or poses, which may be important factors of creating a 3D representation. Some embodiments described herein arise from the recognition that, in image processing operations to create a 3D representation of a subject from images captured by an image capture device, the 3D representation may be degraded if the corresponding pose of the image capture device and/or a related 3D map cannot be accurately determined. Embodiments described herein are thus directed to using improved techniques to combine recursive and non-recursive approaches to creating and/or updating a 3D map and/or determining accurate estimated poses of the image capture device. Recursive techniques relate to or involve the repeated application of a rule, definition, or procedure to successive results. Any of the operations described herein as being recursive may be performed in a causal manner on the poses and operations described as being non-recursive may be performed in an a causal manner on the poses, respectively.

More particularly, a robust and accurate method that can deliver real-time pose estimates and/or a 3D map for 3D reconstruction and provide enough information for camera calibration is described in various embodiments. The inventive concepts described herein combine a non-recursive initialization phase with a recursive sequential updating (tracking phase) system. Initialization of the 3D map or structure may be based on the scene or the scene structure that is discerned from a series of 2D images or frames. Sequential tracking or sequential updating may also be referred to as recursive pose and positioning. During the initialization phase, a non-recursive initialization of the 3D map and the poses is used to localize the camera for 2D frames. An initial map of the scene, which is represented by a set of 3D coordinates corresponding to salient image points that are tracked between sequential frames, is constructed and the camera poses (orientation and position of the camera along its trajectory) are computed. Criteria, such as, for example, the number of tracked points or the pose change, are used to decide if the current frame should become a key-frame. Key frames are selected as representative sets of frames to be used in the localization. If a given frame is selected as a key frame, a local/global bundle adjustment (BA) may be used to refine the key-frames positions and/or to refine or triangulate new 3D points. During this processing a global feature database may be created and populated with globally optimized landmarks. Each landmark may be associated with some stored information such as the related 3D coordinates, a list of frames/key-frames where it was visible, and/or a reference patch. After the initialization phase, a set of anchor landmarks may be available when the sequential updating and/or tracking phase is entered. A fully recursive system, also based on feature tracking, may be used to localize the camera. In particular, the initial set of global features may reduce and/or remove the known drift problem of localization with recursive systems.

Figure 4A:
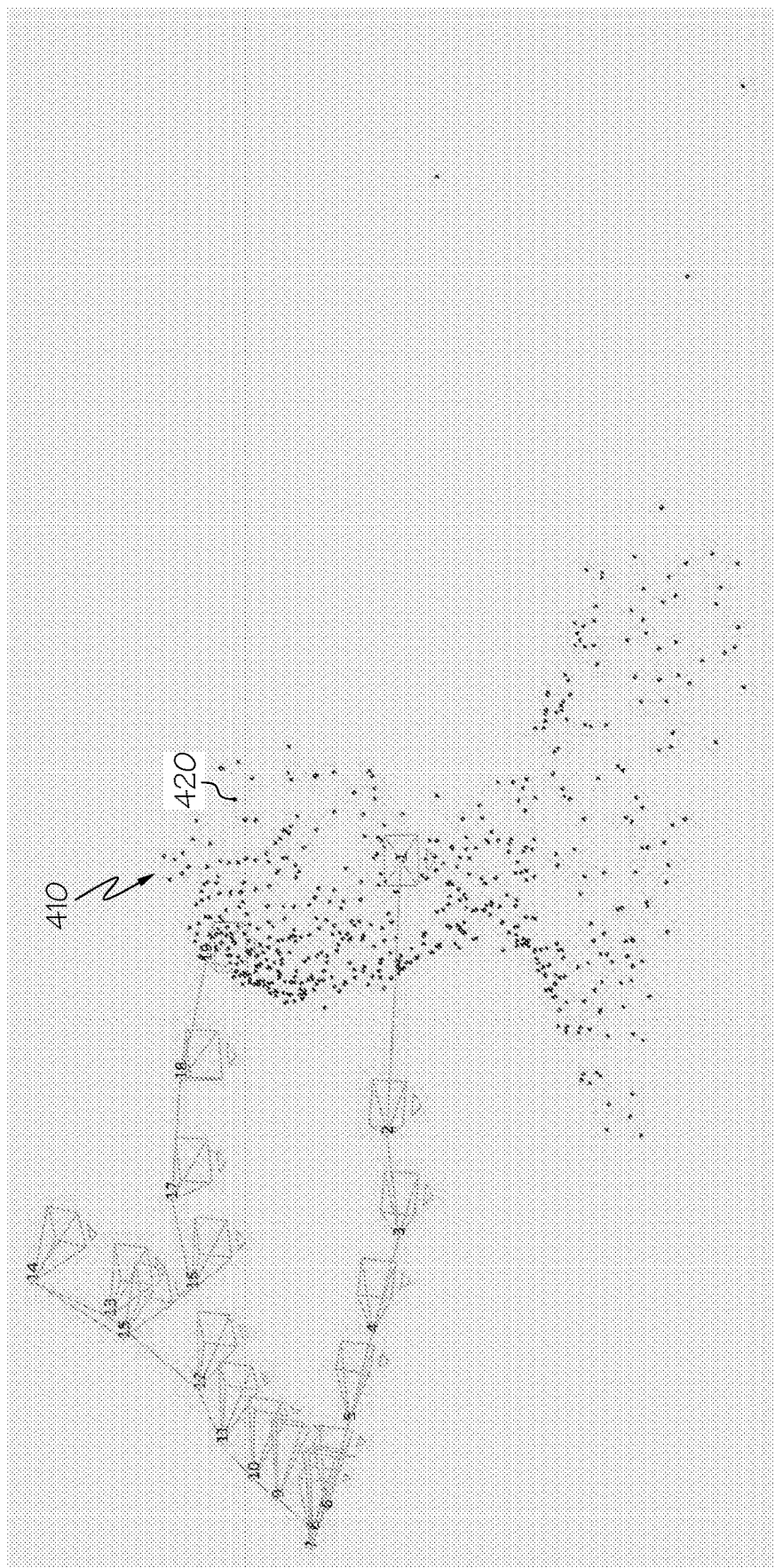
FIGS. 4A to 5B illustrate localization and/or reconstruction of 3D images, according to various embodiments described herein.
Figure 4B:
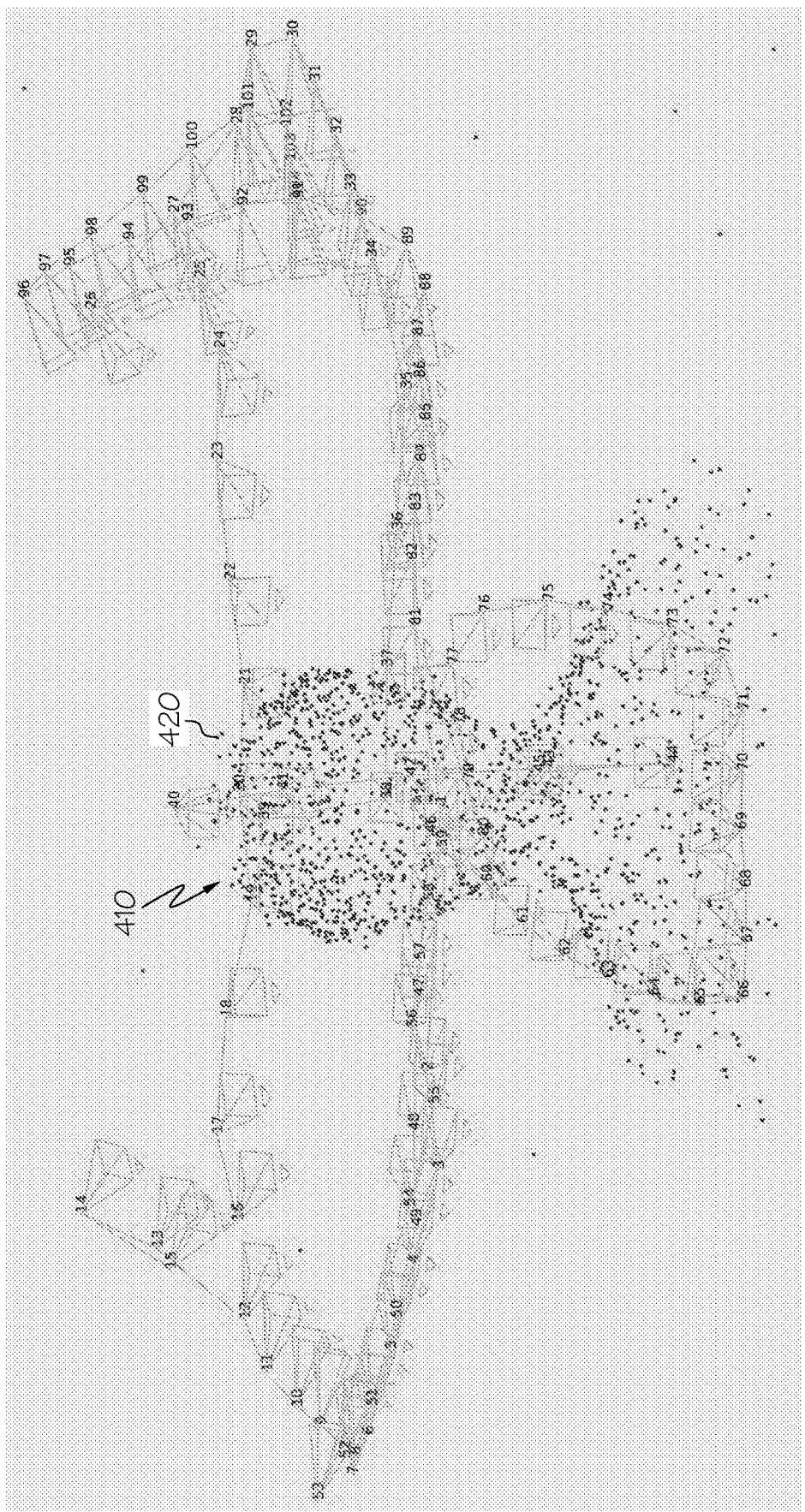

FIGS. 4A and 4B illustrate localization of 3D poses, corresponding to block 204 of FIG. 2. Referring now to FIG. 4A, several 2D images of an object such as the face of a person have been collected during a portion of a scan. The poses 1 to 19 are estimated at various camera viewpoints of the 2D images. A 3D map 410 of the object including various 3D points 420 is constructed. Referring now to FIG. 4B, the scan is continued by capturing additional 2D images for which poses 20 to 96 are estimated. The 3D map 410 includes additional 3D points 420 that have been triangulated from the additional 2D images.

Figure 5A:
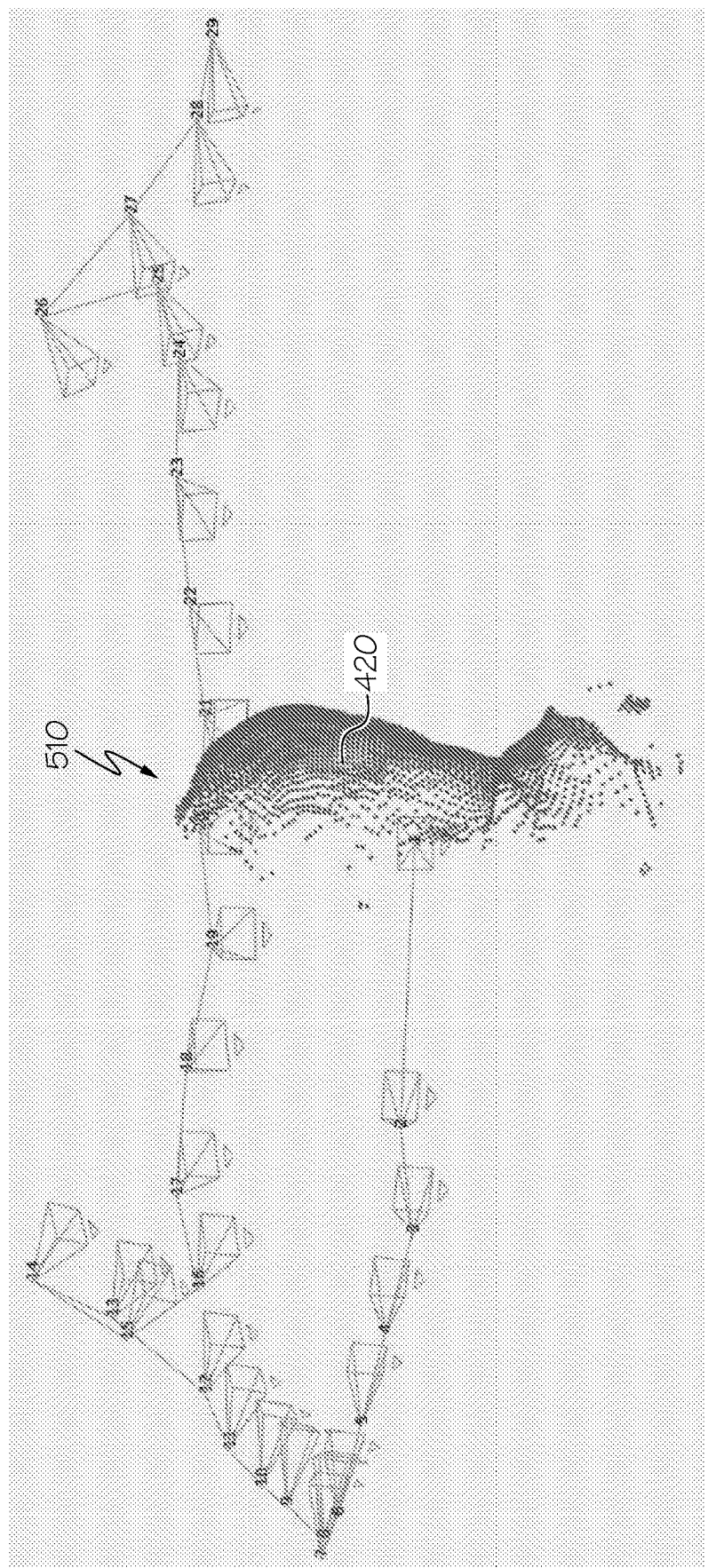
Figure 5B:
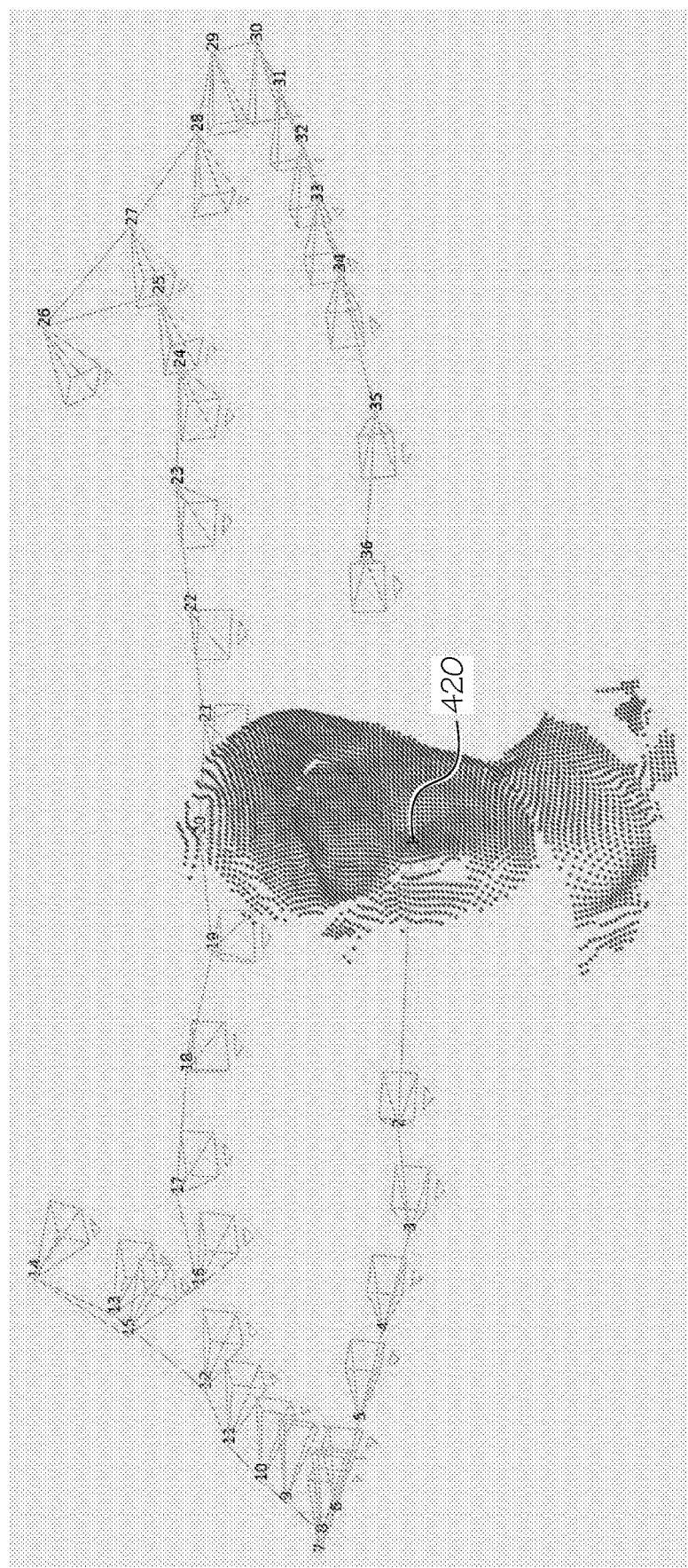

FIGS. 5A and 5B illustrate reconstruction or dense estimation, corresponding to block 205 of FIG. 2. Referring now to FIG. 5A, several 2D images of an object such as the face of a person have been collected during a portion of a scan. The poses 1 to 29 are estimated at various camera viewpoints of the 2D images. A 3D reconstruction 510 of the object including various 3D points 420 is constructed. Referring now to FIG. 5B, the scan is continued by capturing additional 2D images for which poses 30 to 36 are estimated.

The 3D reconstruction 510 includes additional 3D points 420 that have been triangulated from the additional 2D images.

Figure 6A:
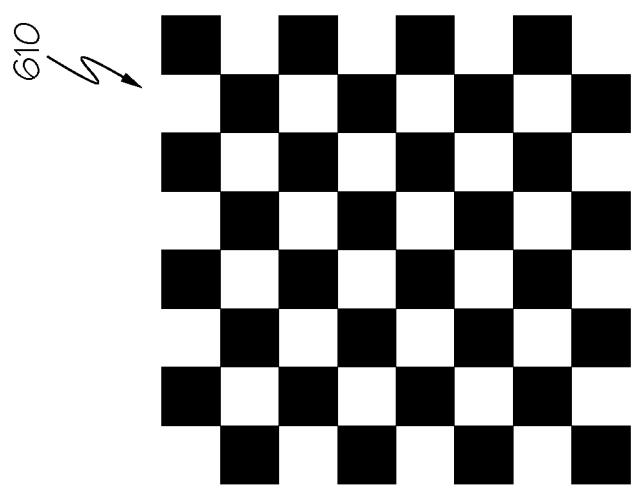
FIGS. 6A to 7B illustrate various types of distortion of 2D images, according to various embodiments described herein.
Figure 6B:
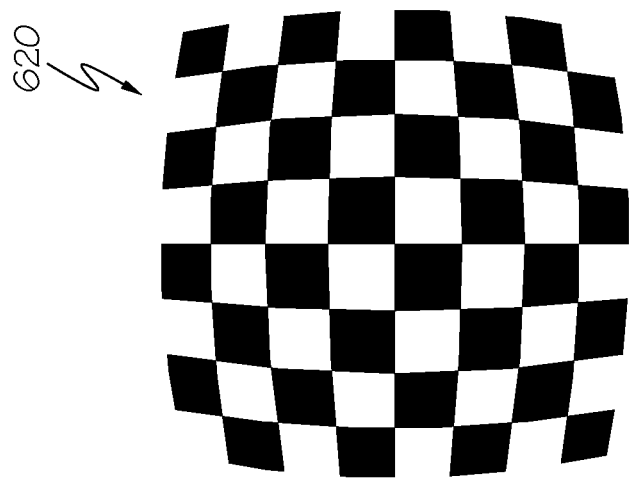
Figure 6C:
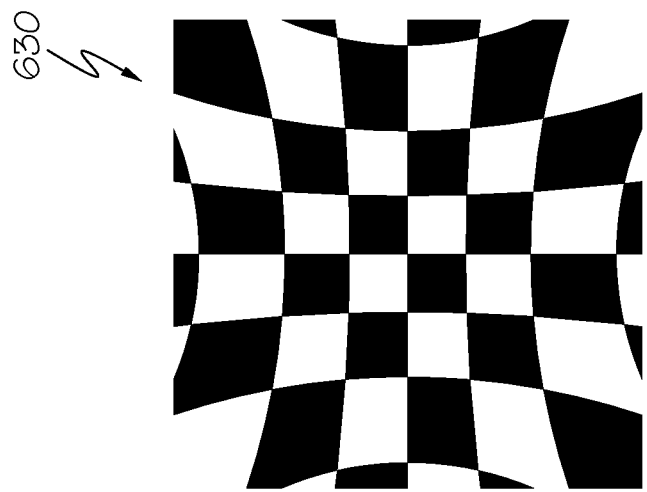

The 2D images 130 collected in FIG. 1 may include various forms of distortion. FIGS. 6A to 7B illustrate various types of distortion of 2D images. A 2D image of a checkerboard pattern is illustrated in FIGS. 6A to 6C for ease of discussion regarding distortion. Referring to FIG. 6A, a 2D image 610 with no distortion is illustrated. FIGS. 6B and 6C illustrate radial distortion. Referring to FIG. 6B, image 620 includes positive radial distortion. Referring to FIG. 6C, image 630 includes negative radial distortion.

Figure 7A:
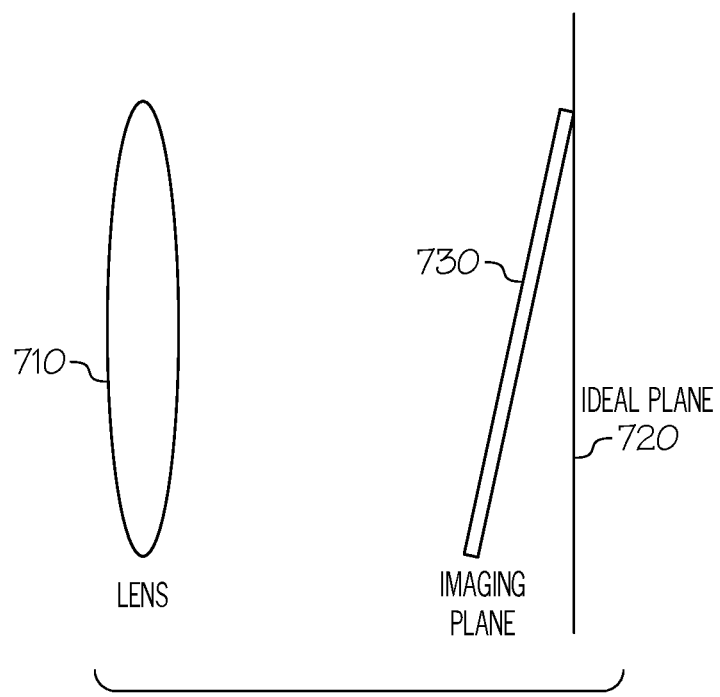
Figure 7B:
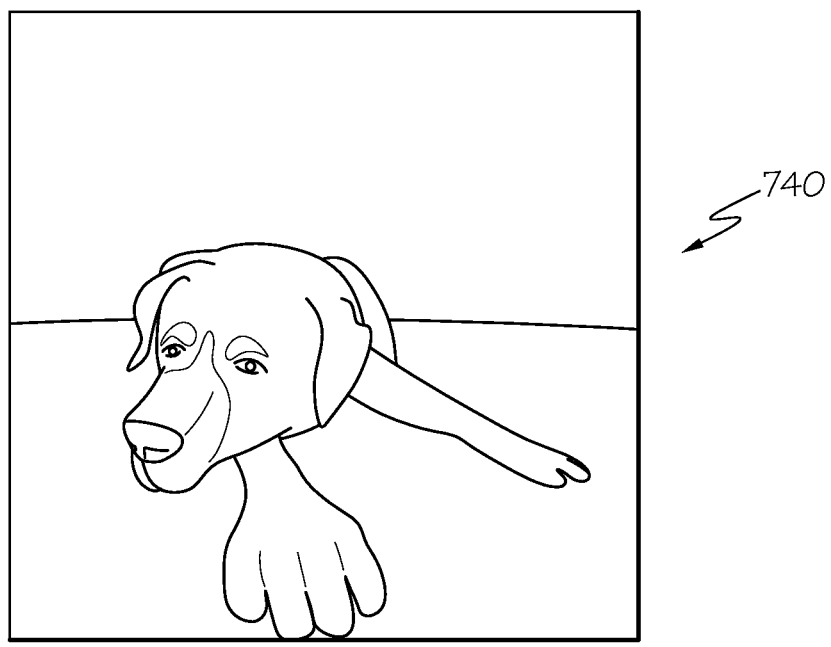

When the lens of a camera is not parallel to the imaging plane, tangential distortion may be produced. Referring now to FIG. 7A, a lens 710 may be part of an image capturing system. A 2D image may be captured at the lens 710 such that the imaging plane 730 is tilted with respect to the ideal imaging plane 720. This results in an image 740, shown in FIG. 7B that includes tangential distortion such that the foreground of the image appears larger than the background. In FIG. 7B, the paw of the dog appears proportionally larger than the rest of the dog due to tangential distortion of the camera that captured image 740. As will now be discussed, these various types of distortion will be taken into account in the camera model for estimating poses and/or the 3D map.

The camera model autocalibration approach uses information collected during scene mapping and camera localization. In contrast to batch techniques, the autocalibration techniques described herein may be sequential and/or recursive in the sense that the camera intrinsic parameter estimates may be propagated and refined over scans. This recursive technique makes the calibration more robust compared to batch approaches since the technique does not rely on one single data sample, but adjust the parameter estimates every time the application is used and new data becomes available. An alternative may be to store all previously collected data samples and then use some batch technique on the full data history, but such a strategy may be memory inefficient.

Figure 8:
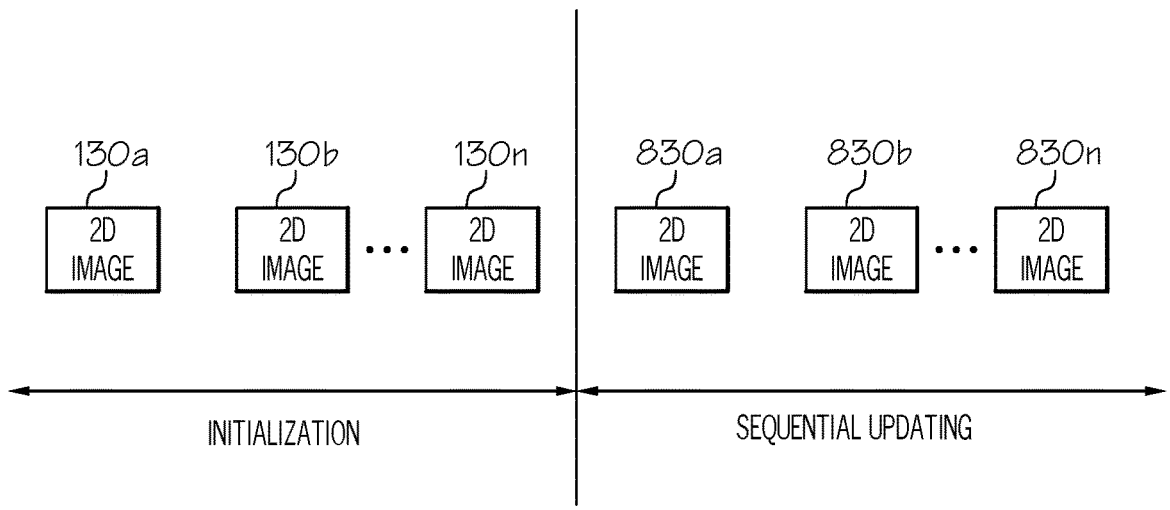
FIG. 8 illustrates 2D images that have been received, according to various embodiments described herein.

The 3D estimation techniques that will now be discussed include a real-time system which provides camera localization suitable for 3D reconstruction. FIG. 8 illustrates a series of 2D images that have been received. The series of 2D images include first 2D images 130a to 130n and second 2D images 830a to 830n This system includes a non-recursive part, i.e. initialization, that is performed on a plurality of first 2D images 130a to 130n and a recursive part, i.e. sequential updating, that is performed on a plurality of second 2D images 830a to 830n. The first and second 2D images need not be consecutive, abutting, or non-overlapping. This system may be extended to include calibration of the intrinsic parameters in the camera model using batch processing in each scan, i.e. autocalibration. This system may be further extended to include sequential autocalibration. The sequential autocalibration is presented below. The considered camera models will be described, followed by the theoretical design behind the algorithms.

Camera Models

A pinhole camera model may be represented by a function U, for the image $u = U(x, R, z; c^{\square}) \in R^2$ of a scene point $x \in R^3$ seen by a camera with orientation $R \in SO(3)$ and position $z \in R^3$, where $SO(3)$ denotes the 3D rotation group and may be represented as a 3×3 rotation matrix. The pair $(R, z)$ represents the pose of the camera where R is the angular orientation and z is the position. The vector $c^{\square}$ represents the intrinsic camera parameters that represent the internal geometries of the camera. Intrinsic parameters may include focal length, image sensor format, skew between axes associated with the image, tangential distortion, radial distortion, and/or a principal point. Although the principal point is ideally at the center of the image, the principal point of the image may not necessarily be the center point of the image since distortion of the lens may result in one or more pixels being shifted from the center point of the lens.

The distortion elements may not depend on the scene that is captured by the camera. Thus, distortion elements such as radial distortion and tangential distortion that were discussed with respect to FIGS. 6A to 7B may be part of the intrinsic camera parameters. In other words, the radial distortion and tangential distortion may remain the same regardless of the captured image resolution. For example, if a camera has been calibrated on images of 320×240 resolution, the same distortion coefficients can be used for 640×480 images from the same camera while factors such as focal length may need to be appropriately scaled. The radial distortion component may be based on the camera model's shape of the lens. The tangential distortion component may be related to how the lens of the camera is tilted towards the image sensor of the camera. In other words, tangential distortion may occur when the lens of the camera is not parallel to the imaging plane. As an example, significant tangential distortion may cause an image to appear as if the foreground portion of an object is disproportionately larger than a background portion of the object.

Figure 9:
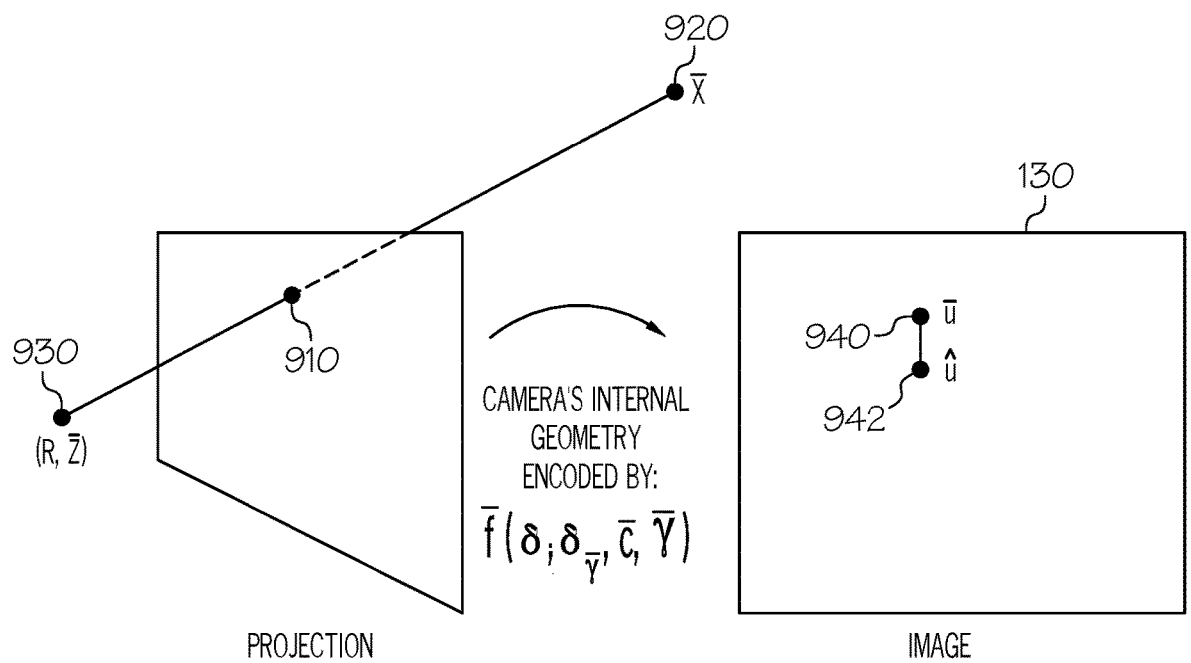
FIG. 9 illustrates creation of a camera model, according to various embodiments described herein.

FIG. 9 illustrates creation of a camera model. Referring to FIG. 9, a feature point or landmark in a 2D image 130 may have a measurement $\hat{u}$ 942 that corresponds to a pixel coordinate. The 2D point u 940 is the predicted image coordinate of the 3D point. A statistical goal is to reduce or minimize the prediction error, which is the distance between $\hat{u}$ 942 and u 940. (R, z) 930 represents the pose of the camera where R is the angular orientation and z is the camera position. z may be a vector with three components. A projection of x 910 depends on the coordinates and the pose. x 920 is a 3D point in the 3D map. In other words, a collection of x 3D points forms the 3D map.

To model varying focus, the intrinsic camera parameters depend on the focal distance $\delta \in R_+$ according to some suitable function $c^{\square} = f(\delta; \delta_\gamma, c, \gamma)$. $\delta$ is the focal distance that can change on an image by image bases. The c is the intrinsic parameter vector at the reference distance $\delta_\gamma \in R_+$, i.e. $c = f(\delta; \delta_\gamma, c, \gamma)$, where the vector $\gamma$ includes intrinsic parameters for the varying focus. The function $f$ may model deviation of the intrinsic parameters when $\delta$ varies from $\delta_\gamma$ such that $f$ may be defined by the formula:

$$f(\delta; \delta_\gamma, c, \gamma) = c + \frac{\delta - \delta_\gamma}{\delta \delta_\gamma} \gamma. \tag{1}$$

Given the known parameter vectors c and $\gamma$ and the pre-defined reference distance $\delta_\gamma$, it is possible to compute the image u of x in a camera with pose (R, z) and focus distance $\delta$ as follows:

$$(x, R, z, \delta) \rightarrow u = U(x, R, z; f(\delta; \delta_\gamma, c, \gamma)) \tag{2}$$

The model in equation (2) captures the fixed focus case by keeping $\delta = \delta_\gamma$ constant.

Hence, based on the above description, the fixed and varying focus cases are both modeled using this general formulation of the camera model. The camera model that is derived may be applied to pose estimation, according to various embodiments described herein.

Figure 10:
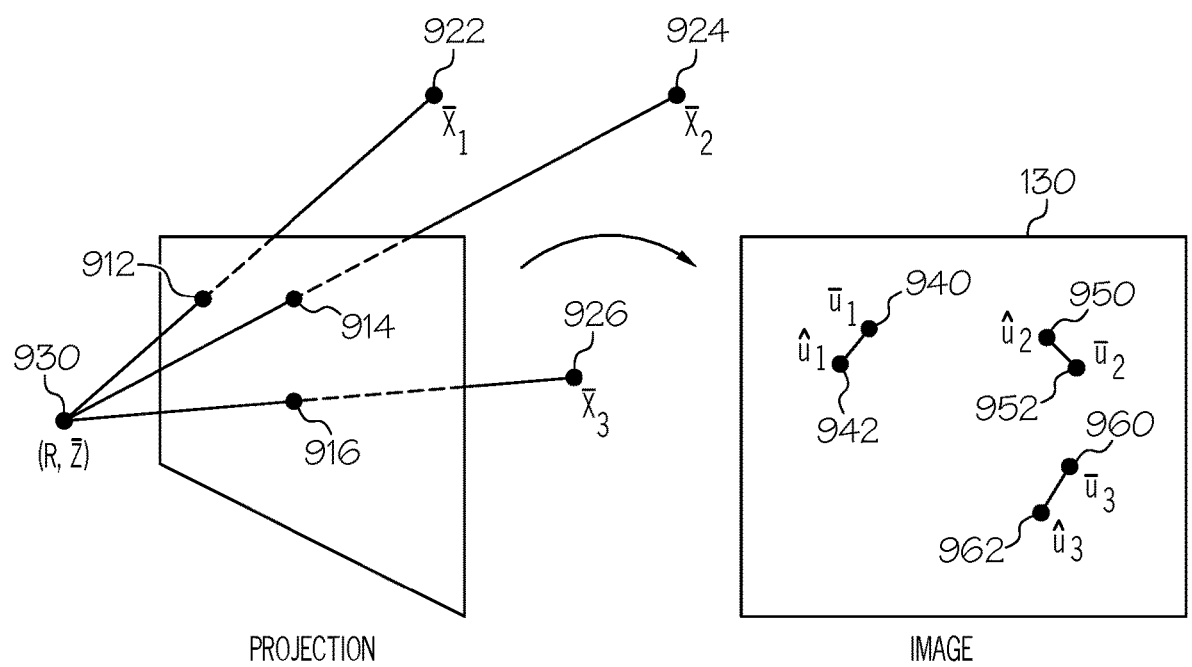
FIG. 10 illustrates pose estimation, according to various embodiments described herein.

FIG. 10 illustrates pose estimation, according to various embodiments described herein. Referring now to FIG. 10, from a 2D image 130, observations in the image captured by the camera are available as measurements $\hat{u}_m$ 942, 950, and/or 960 that correspond to pixel coordinates. The 2D points $u_m = U(x_m, R, z; f(\delta_n; \delta_\gamma, c, \gamma))$ 940, 952, and/or 962 are the predicted image points corresponding to the known 3D points $x_m$ 922, 924, and/or 926. The intrinsic parameter vector c, the auto focus coefficients $\gamma$ and the focal distances $\delta_\gamma$ and $\delta$ are known. In some embodiments, to find the pose (R, z), the likelihood of the measurements $\hat{u}_m$ is maximized over (R, z) given a probability density function for the prediction errors $\hat{u}_m - u_m$ conditioned on (R, z). The pose (R, z) 930 is thus estimated.

Figure 11:
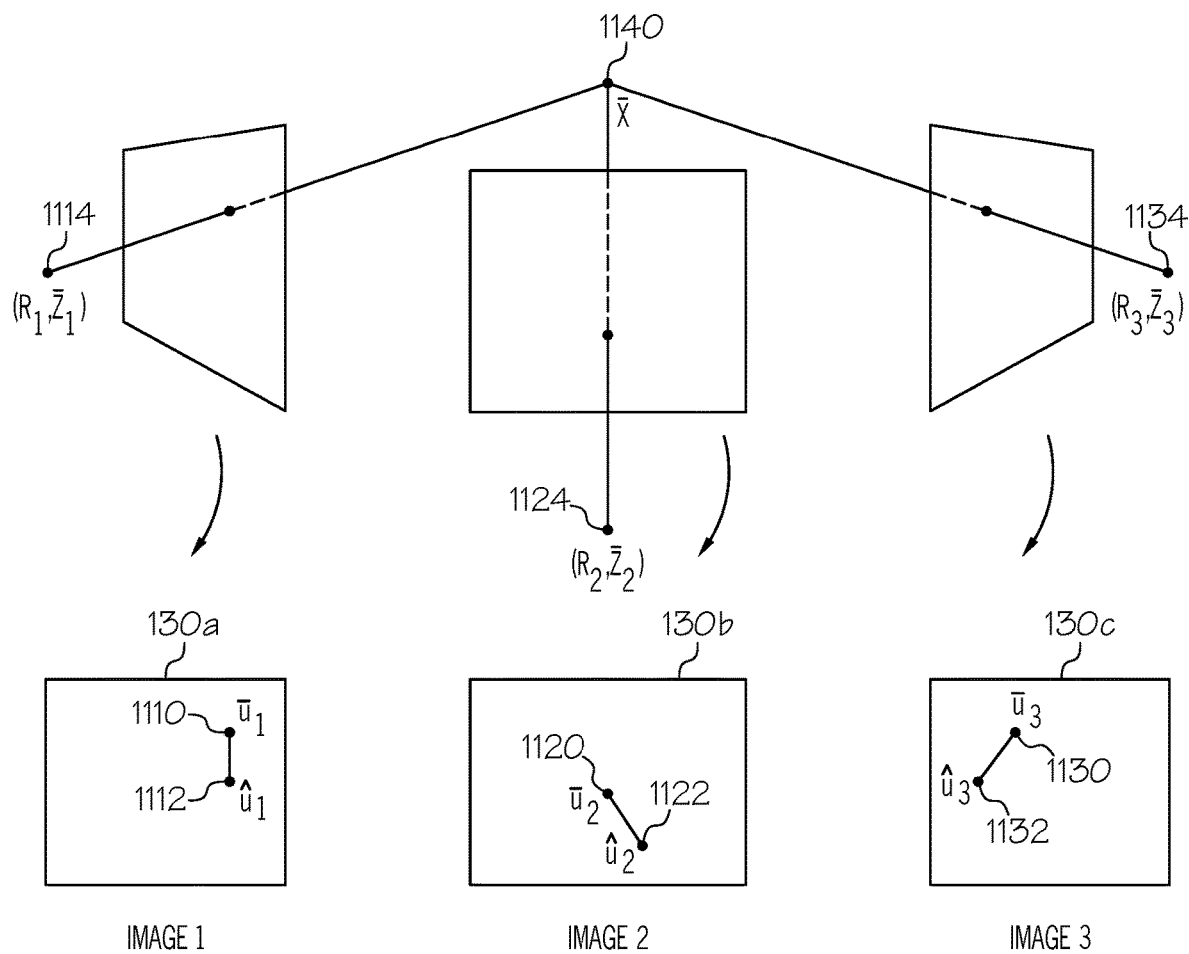
FIG. 11 illustrates 3D point estimation, according to various embodiments described herein.

FIG. 11 illustrates 3D point estimation, according to various embodiments described herein. 3D point estimation is performed using triangulation, as will now be described. Referring to FIG. 11, three 2D images 130a, 130b, and 130c contain measured 2D points $\hat{u}_n$ 1112, 1122, and/or 1132 that correspond to pixel coordinates. The 2D points $u_n = U(x, R_n, z_n; f(\delta_n; \delta_\gamma, c, \gamma))$ 1110, 1120, and 1130 are the predicted image points corresponding to x in the images 130a, 130b, and 130c model of the 3D point. The intrinsic parameter vector c, the auto focus coefficients $\gamma$ and the focal distances $\delta_\gamma$ and $\delta_n$ are known and the 3D point x is to be estimated. The poses 1114, 1124, and/and 1134 may be available and known as described with respect to FIG. 10. In some embodiments, to find the 3D point x 1140, the likelihood of the measurements $\hat{u}_n$ is maximized over x given a probability density function for the prediction errors $\hat{u}_n - u_n$ conditioned on x. The 3D point x 1140 is thus estimated.

Figure 12:
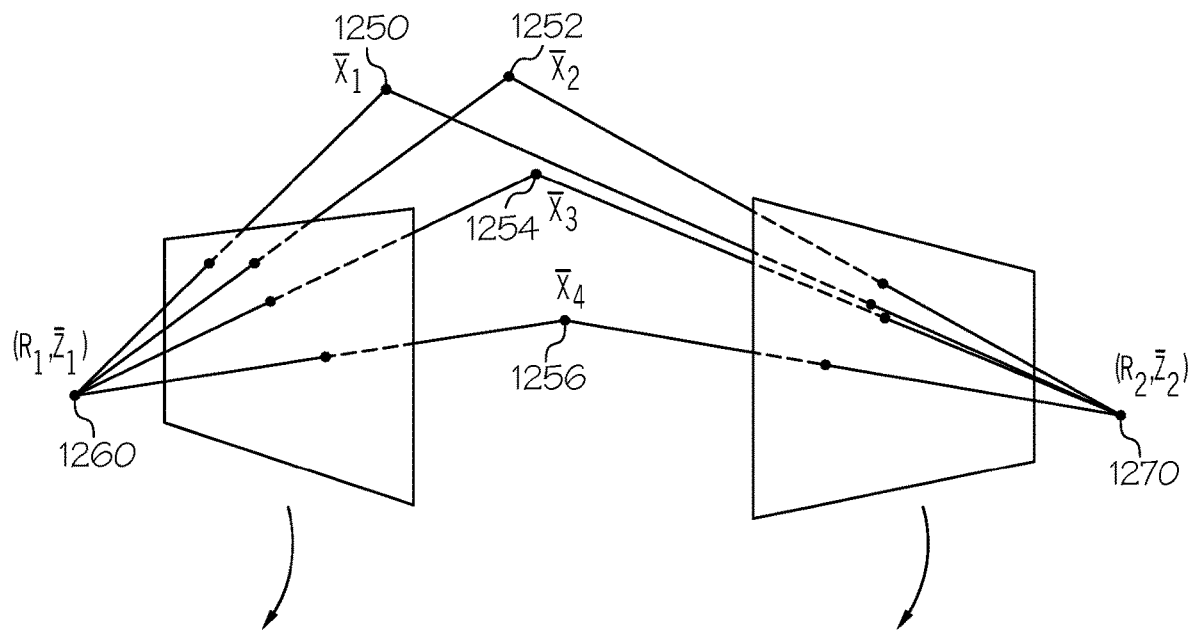
FIG. 12 illustrates bundle adjustment, according to various embodiments described herein.

Once estimates of the 3D map, camera poses, and camera intrinsic are available, bundle adjustment may be performed to refine the 3D map and/or to refine the camera poses and/or to refine the camera intrinsic parameters. FIG. 12 illustrates bundle adjustment of the 3D map, camera poses and the camera intrinsics, according to various embodiments described herein. The 3D map in FIG. 12 contains M=4 3D points $x_m$ and N=2 2D images 130a and 130b. Each 2D image include measured feature points $\hat{u}_{nm}$ and predictions $u_{nm} = U(x_m, R_n, z_n; f(\delta_n; \delta_\gamma, c, \gamma))$. Here, n indexes the images and m indexes the 3D points in the 3D map. The likelihood of the measurements $\hat{u}_{nm}$ is maximized over the 3D points $x_m$ and/or the poses $(R_n, z_n)$ and/or the camera intrinsic parameter vector c given a probability density function for the prediction errors $\hat{u}_{nm} - u_{nm}$ conditioned on the 3D points x, and/or the poses $(R_n, z_n)$ and/or the camera intrinsic parameter vector c. The focal distances $\delta_n$ and $\delta_\gamma$ are known. The autofocus parameter vector is known. Thus the 3D map points $x_m$, m=1, 2, ..., M and/or the poses $(R_n, z_n)$, n=1, 2, ..., N and/or the camera intrinsic parameter vector c are bundle adjusted.

Figure 13:
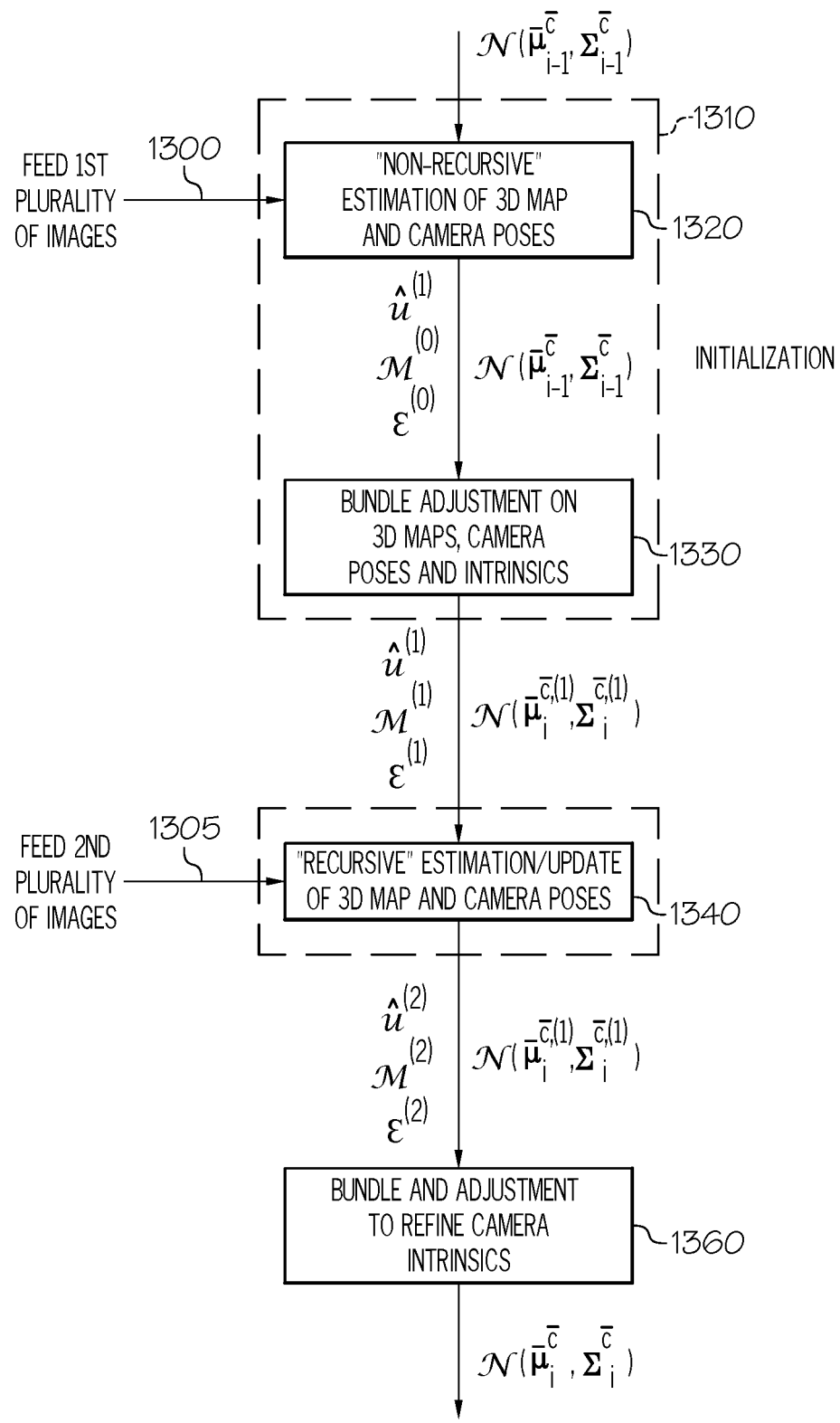
FIGS. 13 and 14 are flowcharts of operations for estimating a 3D map and/or poses, according to various embodiments described herein.
Figure 14:
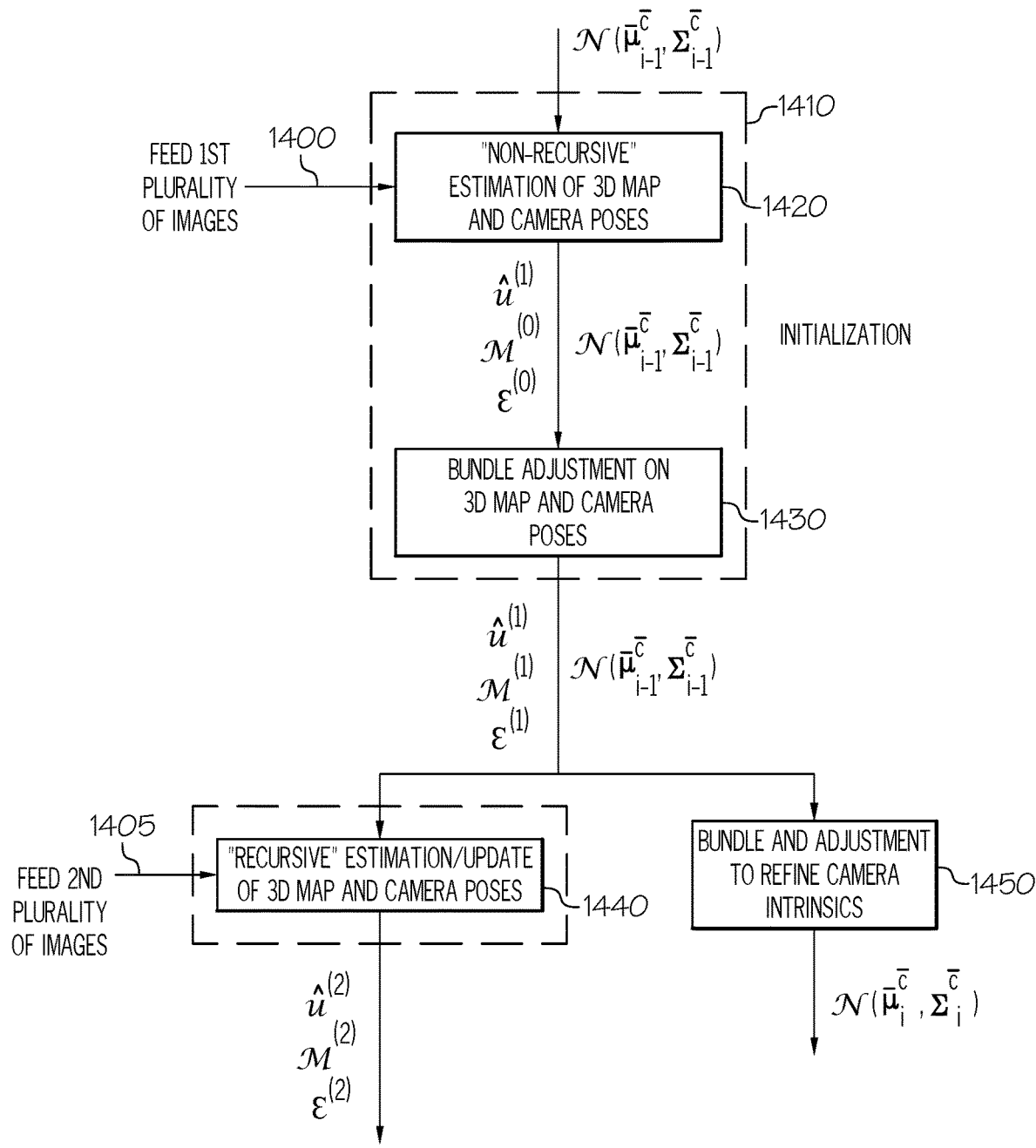

The pose estimation, 3D point estimation, and/or bundle adjustment techniques described with respect to FIGS. 9 to 12 will now be applied to describe estimating the 3D map and poses, according to various embodiments described herein. FIGS. 13 and 14 are flowcharts of operations for estimating a 3D map and/or poses, according to various embodiments described herein. Referring now to FIG. 13, a prior probability distribution of the camera intrinsic parameter vector c is known. Operations are performed on a plurality of first 2D images 1300. Initialization at block 1310 may include non-recursive estimation of the 3D map and/or camera poses at block 1320, and/or bundle adjustment on the 3D map, camera poses, and/or camera intrinsic parameters at block 1330. The non-recursive estimation at block 1320 results in an estimate of 3D points in the 3D map and estimates of poses. The initialization at block 1310 may further include bundle adjustment at block 1330 as described above with respect to FIG. 12, to refine or update the probability distribution of the camera intrinsic parameters and refine the camera poses and refine the 3D points in the 3D map. This bundle adjustment of the camera intrinsic parameters may be referred to as autocalibration and later described in further detail.

Still referring to FIG. 13, the system may receive a plurality of second 2D images of the series of the 2D images at block 1305. Recursive estimation and/or updating of the 3D map and/or the camera poses may be performed at block 1340. These operations may include recursively performing sequential updating of the 3D map based on recursively updating the 3D map for the plurality of second 2D images 1305 of the series of 2D images. The result of the recursive updating 1340 may be an updated 3D map and additional poses based on the plurality of second 2D images. The camera intrinsic parameters are not updated in this recursive step. At block 1360, bundle adjustment may be performed to refine the camera intrinsic parameters. This bundle adjustment at block 1360 is based on both the plurality of first 2D images and the plurality of the second 2D images by optimizing over the 3D map and the poses, as discussed with respect to FIG. 12 and similar operations to block 1330 of FIG. 13. The probability distribution of the camera intrinsic parameters that have been updated by the operations of block 1360 may be used for a second scan that is different from the current scan that has been described in FIG. 13.

Some embodiments for estimating a 3D map and/or poses may be implemented by the operations of the flowchart of FIG. 14. Referring now to FIG. 14, a prior probability distribution of the camera intrinsic parameters cis known. Operations are performed on a plurality of first 2D images 1400. Initialization at block 1410 may include non-recursive estimation of the 3D map and/or camera poses at block 1420, and/or bundle adjustment on the 3D map, camera poses, and/or camera intrinsic parameters at block 1430. For the non-recursive estimation at block 1420. The non-recursive estimation at block 1420 results in an estimate of 3D points in the 3D map and estimates of poses. The initialization at block 1410 may further include bundle adjustment at block 1430 as described above with respect to FIG. 12, to refine or update the 3D points in the 3D map and refine the camera poses.

Still referring to FIG. 14, the system may receive a plurality of second 2D images of the series of the 2D images at block 1405. Recursive estimation and/or updating of the 3D map and/or the camera poses may be performed at block 1440. These operations may include recursively performing sequential updating of the 3D map based on recursively updating the 3D map for the plurality of second 2D image 1405 of the series of 2D images. The result of the recursive updating 1340 may be an updated 3D map and additional poses based on the plurality of second 2D images. The camera intrinsic parameters are not updated in this recursive step. At block 1450, bundle adjustment is performed to refine the probability distribution of the camera intrinsic parameters. This bundle adjustment at block 1450 is based on the plurality of first 2D images but not the plurality of the second 2D images. The bundle adjustment is performed by optimizing over the 3D points in the 3D map and the poses and the camera intrinsic parameters, as discussed with respect to FIG. 12 and similar operations to block 1430 of FIG. 14. The camera intrinsic parameters that have been updated by the operations of block 1450 may be used for a second scan that is different from the current scan that has been described in FIG. 14.

When comparing the embodiments of FIGS. 13 and 14, the bundle adjustment to refine the camera intrinsic parameters at block 1360 uses both the plurality of first 2D images and the plurality of the second 2D images, whereas the bundle adjustment to refine the camera intrinsic parameters at block 1450 uses the plurality of first 2D images but not the plurality of second 2D images. FIGS. 15 to 25 are flowcharts of various operations that may be related to various portions of the embodiments of FIGS. 13 and 14. It is noted that the elements of the flowcharts of FIGS. 15 and 25 may be used in any combinations. For example, the operations of the flowchart of FIG. 15 may be combined with the operations of the flowchart of FIG. 16.

Figure 15:
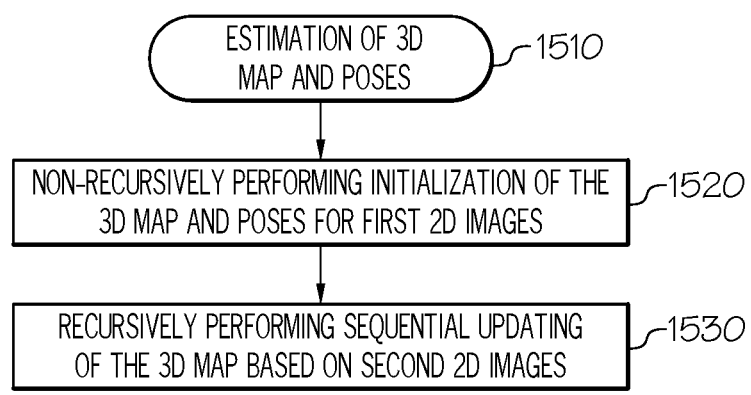
FIGS. 15 to 25 are flowcharts of operations for estimating a 3D map and/or poses, according to various embodiments described herein.

FIG. 15 is a flowchart of operations for estimating a 3D map and/or poses. Referring now to FIG. 15, a 3D map and poses may be estimated from a series of 2D images 130*a* to 130*n* and 830*a* to 830*n* of FIG. 8, at block 1510. Initialization of the 3D map and the respective poses of the plurality of poses, which may correspond to block 1320 of FIG. 13, may be non-recursively performed based on the plurality a first 2D images of the series of 2D images, at block 1520. Sequential updating of the 3D map, corresponding to block 1340 of FIG. 13, may be recursively performed based on recursively updating the 3D map for respective ones of a plurality of second 2D images of the series of 2D images, at block 1530.

Figure 16:
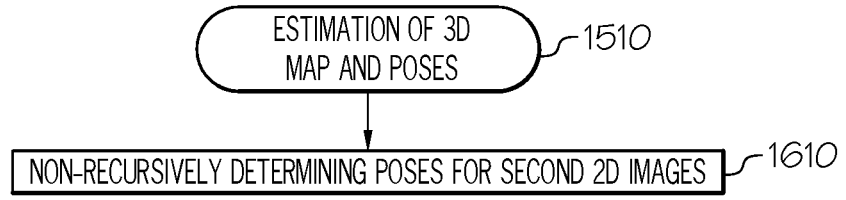

FIG. 16 is a flowchart of operations for estimating a 3D map and/or poses, corresponding to block 1510 of FIG. 15. Poses for the second 2D images may be non-recursively determined at block 1610, which may correspond to block 1360 of FIG. 13.

Figure 17:
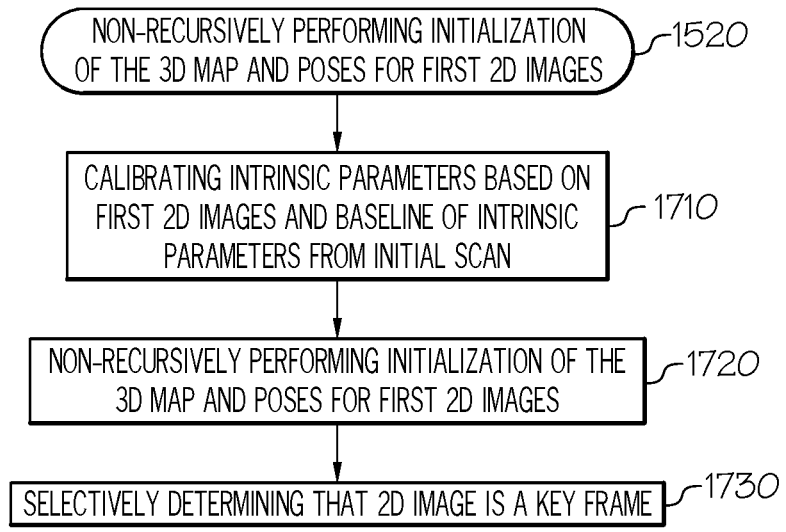

FIG. 17 is a flowchart of operations for non-recursively performing initialization of the 3D map and poses for the first 2D images, corresponding to block 1520 of FIG. 15. The operations of the flowchart of FIG. 15 may be combined with the operations of the flowchart of FIG. 17. The operations of the flowchart of FIG. 17 may be combined with the operations of the flowchart of any of the flowcharts described herein. The intrinsic parameters associated with the camera are calibrated based on the first 2D images and baseline intrinsic parameters from a previous estimation, at block 1710. The baseline intrinsic parameters may be from a previous scan, from a database associated with the camera, and/or other historical camera model information. The baseline intrinsic parameters may be a probability distribution. Initialization of the 3D map and poses for the first two images is non-recursively performed, at block 1720, which may correspond to block 1330 of FIG. 13. A 2D image may be selectively determined to be a key frame, at block 1730. A subset of the 2D images may be designated as key frames. These key frames may be used for various operations described herein, in order to reduce the set of images on which the computations are performed.

Figure 18:
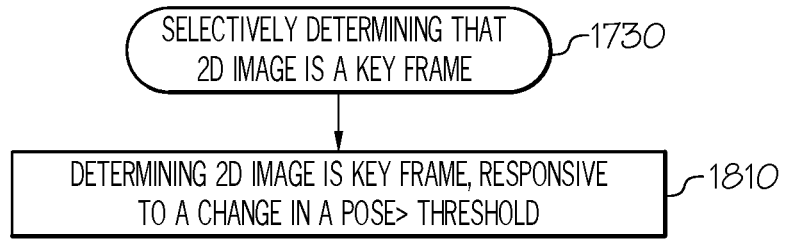

FIG. 18 is a flowchart of operations for determining a key frame, corresponding to block 1730 of FIG. 17. Referring now to FIG. 18, a 2D image may be determined to be a key frame, responsive to a change in a pose being greater than a threshold, at block 1810. The change in pose may be with respect to a previous 2D image or a 2D image that was temporally captured in close proximity in time to the current 2D image that is being evaluated as a potential key frame. A given 2D images may be compared to a previous 2D image by comparing the orientation and/or angular differences of the 3D representation of the images. The position of capture of the 2D images may also be compared to determine if a given image is a key frame.

Figure 19:
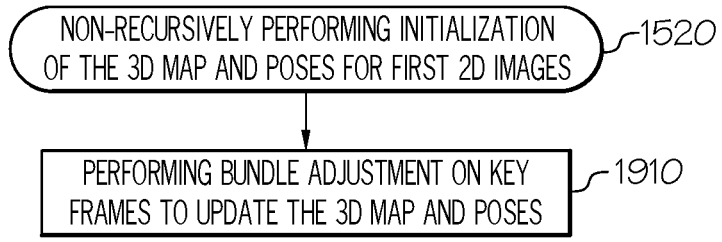

FIG. 19 is a flow chart of operations for non-recursively performing initialization of the 3D map and poses for the first 2D images, which may correspond to block 1520 of FIG. 15. Referring now to FIG. 19, bundle adjustment may be performed on key frames to update the 3D map and poses, at block 1910. These operations may correspond to block 1330 of FIG. 13.

Figure 20:
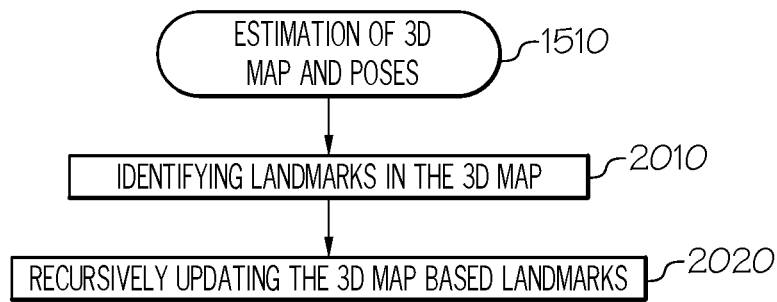

FIG. 20 is a flowchart of operations for estimating a 3D map and/or poses, corresponding to block 1510 of FIG. 15. The operations of the flowchart of FIG. 15 may be combined with the operations of the flowchart of FIG. 20. Referring now to FIG. 20, landmarks in the 3D map may be identified, and block 2010. These landmarks may be feature points that correspond to specific points in the 2D images such as feature points or landmarks 140 to 148 on the face of the person in FIG. 1. Recursive updating of the 3D map may be based on one or more landmarks that were identified during non-recursively performing the initialization, at block 2020.

Figure 21:
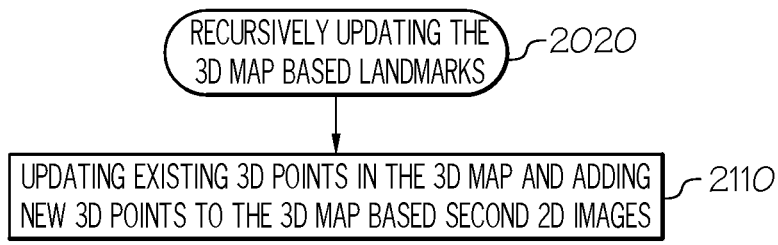

FIG. 21 is a flowchart of operations for recursively updating the 3D map based on landmarks, which corresponds to block 2020 of FIG. 20. Referring now to FIG. 21, existing 3D points in the 3D map may be recursively updated and/or new 3D points may be added to the 3D map based on the second 2D images 830*a* to 830*n* of FIG. 8, at block 2110.

Figure 22:
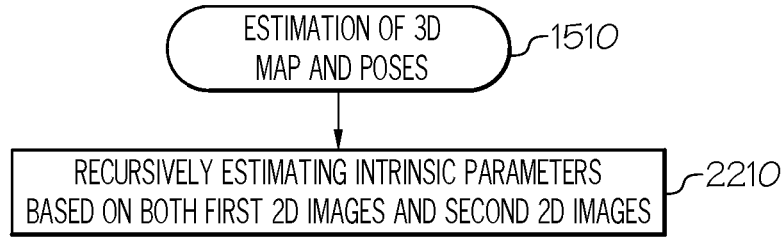

FIG. 22 is a flowchart of operations for estimating a 3D map and/or poses, corresponding to block 1510 of FIG. 15. The operations of the flowchart of FIG. 15 may be combined with the operations of the flowchart of FIG. 22. The operations of the flowchart of FIG. 22 may be combined with the operations of the flowchart of any of the flowcharts described herein. Referring now to FIG. 22, sequential calibration operations may be performed. Intrinsic parameters associated with the camera may be recursively estimated based on both the first 2D images and the second 2D images of FIG. 8, at block 2210. The first 2D images and the second 2D images that comprise the series of 2D images may be referred to as a scan.

Figure 23:
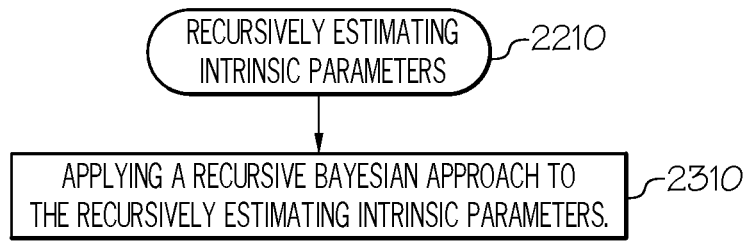

FIG. 23 is a flowchart of operations for recursively estimating intrinsic parameters at block 2210 of FIG. 22. Referring now to FIG. 23, recursively estimating these intrinsic parameters may be accomplished by applying a recursive Bayesian approach, at block 2310. Applying a recursive Bayesian approach may be accomplished by updating intrinsic parameters between two scans. The intrinsic parameters may be based on Bayesian averaging between a current scan and a previous scan. Details of the Bayesian approach and its basis in Baye's theorem is further explained in detail later.

Figure 24:
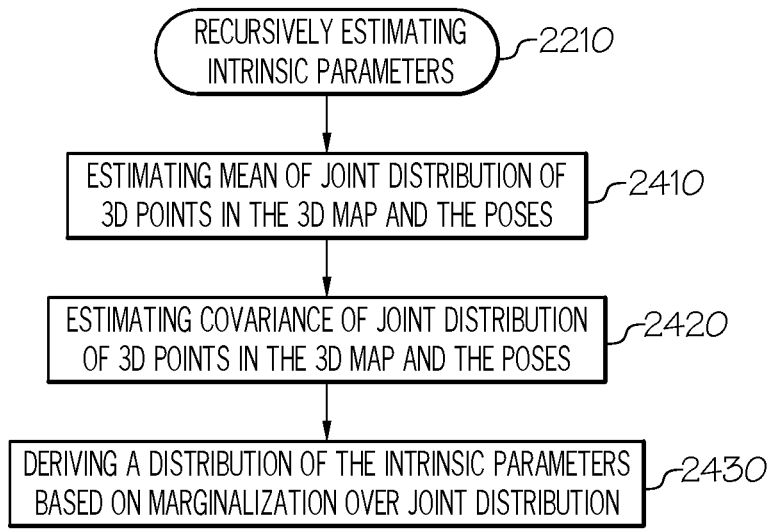

FIG. 24 is a flowchart of operations for recursively estimating the intrinsic parameters of block 2210 of FIG. 22. Referring now to FIG. 24, the mean of the joint distribution of the 3D points in the 3D map and the poses may be estimated, at block 2410. The covariance of the joint distribution of the 3D points in the 3D map and the poses may be estimated, at block 2420. A distribution of the intrinsic parameters may be derived based on marginalization over the joint distribution, at block 2430. The marginal distribution of a subset of a collection of random variables is the probability distribution of the variables contained in the subset. Marginalization gives the probabilities of various values of the variables in the subset without reference to the values of the other variables. This contrasts with a conditional distribution, which gives the probabilities contingent upon the values of the other variables.

Figure 25:
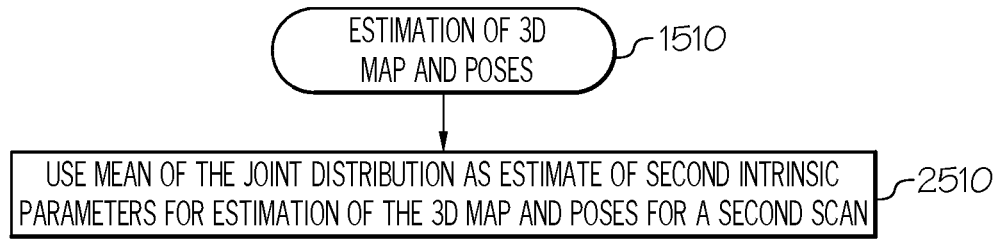

FIG. 25 is a flowchart of operations for estimation of a 3D map and poses a block 1510 FIG. 15. The operations of the flowchart of FIG. 15 may be combined with the operations of the flowchart of FIG. 25. Referring now to FIG. 25, the mean of the joint distribution may be used as an estimate of the second intrinsic parameters for estimation of the 3D map and poses for a second scan that follows the first scan, at block 2510. In other words, the resulting updated intrinsic parameters that are output at block 1360 of FIG. 13 or block 1450 of FIG. 14 may be used in the initialization phase in a subsequent scan.

Figure 26:
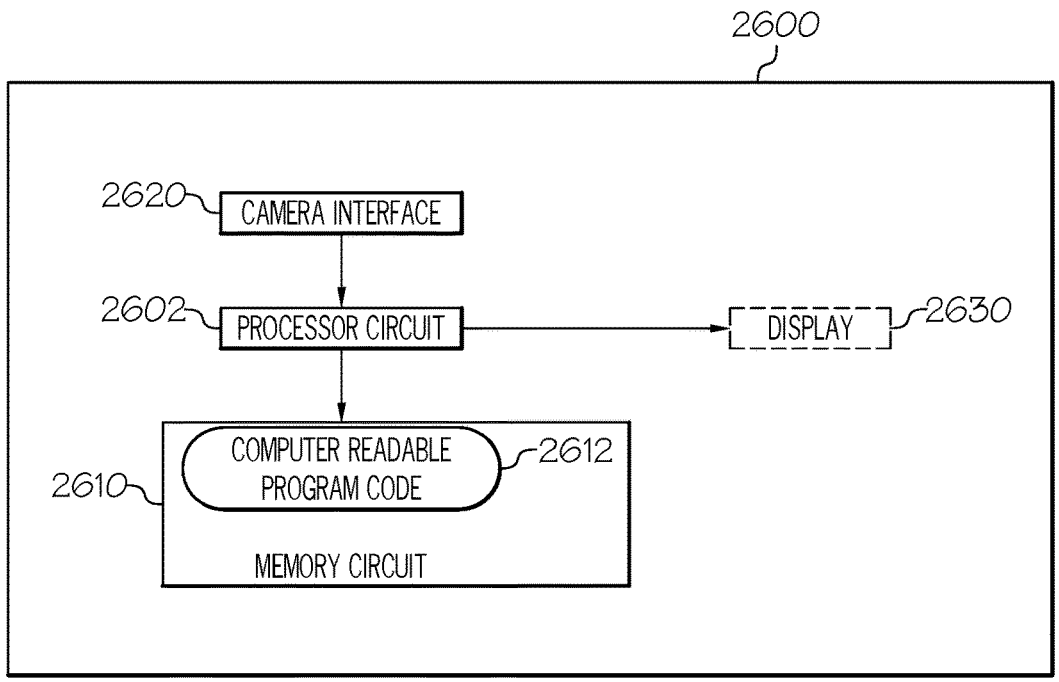
FIGS. 26 and 27 are block diagrams of wireless electronic devices, according to various embodiments described herein.

FIG. 26 is a block diagram of an image processing system 2600 of an electronic device, such as camera 100 of FIG. 1. The image processing system 2600 may be integrated with the camera and/or may be external to the camera and is configured to perform operations according to one or more embodiments disclosed herein. Referring to FIG. 26, the image processing system 2600 includes a display circuit 2630, a processor circuit 2602, and a memory circuit 2610 containing computer readable program code 2612. The processor circuit 2602 may include one or more data processing circuits, such as a general purpose and/or special purpose processor, e.g., microprocessor and/or digital signal processor, that may be collocated or distributed across one or more networks. The processor circuit 2602 is configured to execute the computer readable program code 2612 in the memory 2610 to perform at least some of the operations and methods of described herein as being performed by the image processing module 2600. The camera interface 2620 is coupled to the processor circuit 2602 and may communicate with a server or other external network entity, directly or indirectly.

Figure 27:
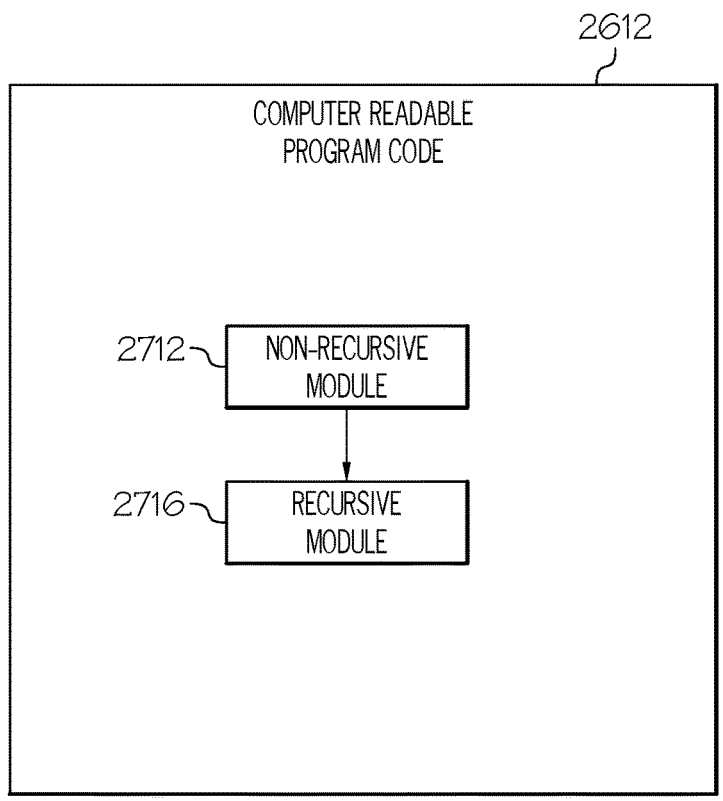

FIG. 27 illustrates modules for an image processing module that perform operations as disclosed herein according to some embodiments. The computer readable program code 2612 of FIG. 26 may include one or more modules. Referring now to FIG. 27, the computer readable program code 2612 may include a non-recursive module 2712 and an recursive module 2716. The non-recursive 2712 is for non-recursively performing initialization of the 3D map and poses for the first 2D images (block 1520 of FIG. 15). The recursive module 2716 is for recursively performing sequential updating of the 3D map based on second 2D images (block 1530 of FIG. 15). The modules 2712 and 2716 may perform other corresponding operations and methods disclosed herein.

Sequential Estimation of the Camera Model Parameters

The bundle adjustment of the camera intrinsic parameters, as described above in block 1330 of FIG. 13 and/or block 1430 of FIG. 14 may be referred to as autocalibration and will now be described in greater detail.

Bayes' theorem describes the probability of an event, based on prior knowledge of conditions that might be related to the event. For example, if cancer is related to age, then, using Bayes' theorem, a person's age can be used to more accurately assess the probability that they have cancer, compared to the assessment of the probability of cancer made without knowledge of the person's age.

A Bayesian approach may be applied to the autocalibration problem by treating the vector c of intrinsic camera model parameters at the reference focus distance $\delta_\gamma$ as a stochastic variable and propagating and refining its probability distribution from one scan to the next. The focus parameter vector γ may be assumed to have a pre-estimated distribution, which will not be refined or updated. For simplicity, the discussion is restricted to measurements that are independent and identically distributed normal random variables. The discussion is also restricted to the refinement of a normal distribution of the camera intrinsic parameters c. Both restrictions may be dropped in favor for other probability distributions. Discussion is facilitated by defining some variables as follows.

$\mathcal{M}$ : The map of the scene, i.e. $\mathcal{M} = \{x_m\}_m$.

$\varepsilon$: The set of all camera poses, i.e. $\varepsilon = \{(R_n, z_n)\}_n$.

$\delta_n$ Focus distance of the camera at pose n.

$\hat{u}_{nm}$: The observed 2D (pixel) coordinate of $x_m$ in frame n.

$\hat{\mathcal{U}}$ : The set of all observations, i.e. $\hat{\mathcal{U}} = \{\hat{u}_{nm}\}_{n,m}$.

p(a|b): The conditioned probability density function of a given b. $\mathcal{M}(\bullet|\mu, \Sigma)$: The normal density function with mean μ and covariance matrix Σ.

In the i:th scan we collect the observations $\hat{\mathcal{U}}$ and assume that a normal prior distribution $\mathcal{M}(\bullet|\mu_{i-1}^c, \Sigma_{i-1}^c)$ of c is available. Our goal is to compute a refined (posterior) distribution $\mathcal{M}(\bullet|\mu_i^c, \Sigma_i^c)$ from the new information that is provided in $\hat{\mathcal{U}}$. This refinement will in turn be used as a prior distribution in the next scan.

In is assumed that the observations are identically and independently distributed normal random variables:

$$P(\hat{u}_{nm}) = \mathcal{M}(\hat{u}_{nm}|U(x_m, R_n, z_n; f(\delta_n; \delta_\gamma, c, \gamma)), s\Sigma_{nm}^u + \Sigma_n^{pred}), \quad (3)$$

where the covariance matrix $\Sigma_{nm}^u \in \mathbb{R}^{2\times 2}$ of the observed image point is pre-estimated with information obtained from the image feature extraction process, $\Sigma_{i-1}^{pred}$ is the predicted covariance obtained by propagating the covariance of γ through $U(x_m, R_n, z_n; f(\delta_n; \delta_\gamma, c, \bullet))$ and s∈R is a scaling factor which we will come back to later. For now, it may be assumed that s is known. Note that equation (3) yields the likelihood function $$p(\hat{\mathcal{U}} | \mathcal{M}, \varepsilon, c, s) = \prod_{nm} \mathcal{N}(\hat{u}_{nm} | U(x_m, R_n, z_n; f(\delta_n; \delta_\gamma, c, \gamma)), s\sum\nolimits_{nm}^{u} + \sum\nolimits_{n}^{pred}). \quad (4)$$

By imposing uniform joint prior distributions on the 3D map M and the set of carrea pose s, it is possible to compute the Laplace approximation $\mathcal{M}(\bullet | \mu^{\mathcal{M},\varepsilon,c}, \mu^{\mathcal{M},\varepsilon,c})$ of the joint posterior distribution $p(\mathcal{M}, \varepsilon, c|\hat{\mathcal{U}})$. This approximation follows a two-step procedure:

Step 1 Estimate the mean $\mu^{\mathcal{M},\varepsilon,c}$ by the maximum a posteriori (MAP) approximation $$(\mathcal{M}, \varepsilon, c)_{MAP} = \underset{\mathcal{M},\varepsilon,c}{\arg\max}\, p(\hat{\mathcal{U}} | \mathcal{M}, \varepsilon, c, s)\mathcal{N}(c | \mu_{i-1}^c, \sum\nolimits_{i-1}^{c}).$$

The computations are done by minimizing the negative log-likelihood $$-\log p(\hat{\mathcal{U}} | \mathcal{M}, \varepsilon, c, s)\mathcal{M}(c|\mu_{i-1}^c, \Sigma_{i-1}^c),$$

which, due to (4), is equivalent to minimizing a weighted least-squares cost where the contribution from $\mathcal{M}(c|\mu_{i-1}^c, \Sigma_{i-1}^c)$ enters as a regularization term.

Step 2 Estimate the covariance matrix $\mu^{\mathcal{M},\varepsilon,c}$ by the inverted normal matrix, evaluated at $(\mathcal{M},\varepsilon,C)_{MAP}$, of the weighted and regularized least-squares problem in Step 1.

The posterior distribution $\mathcal{M}(\bullet|\mu_i^c, \Sigma_i^c)$ is then derived from marginalization over $\mathcal{M}$ and ε. By normality, this marginalization boils down to simply let $\mu_i^c = c_{MAP}$ and read of $\Sigma_i^c$ as the block matrix in $\mu^{\mathcal{M},\varepsilon,c}$ that corresponds to c.

Hyperparameter Estimation

The scale s of the measurement covariances is not known beforehand and some approximation may be required. To this end, it is possible to compute a maximum likelihood estimate (MLE) by solving the bundle-adjustment problem $$(\mathcal{M}, \mathcal{E}, s)_{MLE} = \operatorname*{argmax}_{\mathcal{M},\mathcal{E},s} p(\hat{\mathcal{U}} \mid \mathcal{M}, \mathcal{E}, \mu_{i-1}^c, s) \quad (6)$$

and the use $s=s_{MLE}$ as a constant when performing Step 1 above.

In some embodiments, based on a theoretical approach, hyperparameter optimization may be used via evidence approximation, i.e. to search for the maximizer s of the marginal likelihood of the measurements conditioned on s. This marginal likelihood function may be derived from the joint posterior distribution in Step 1 by marginalizing the 3D points in the 3D map, the poses and the camera intrinsic parameters.

Initialization with a Golden Calibration

The very first prior $\mathcal{M}(\cdot \mid \mu_0^c, \Sigma_0^c)$ which is assumed to be specific to each phone model, may be derived from the sample mean and covariances from manual chess-board calibrations. As an example, a sample of 12 phones for each phone model may be used, but a possible improvement may be to use logged autocalibrated values in order to increase the sample sizes.

Prediction Model

The above estimation technique is equivalent to a Bayesian filter with a constant predictor $$c_i = c_{i-1} + w_{i-1}, \quad (7)$$

Where $w_{i-1}$ is the model noise with mean 0 and covariance matrix $\Sigma_{i-1}^w = 0$. In order to introduce more flexibility to the estimates, some uncertainty may be added to the model equation (7) by assigning non-zero (and positive semi-definite) values to $\Sigma_{i-1}^w$. In practice, this may correspond to a replacement of the prior covariance $\Sigma_{i-1}^c$ with the sum $\Sigma_{i-1}^c + \Sigma_{i-1}^w$ in Step 1 and could be beneficial if the conditions change, such as, for example, if the camera is dropped and its mechanical parts are influenced.

Practical Considerations

The theoretical background to the estimation procedure has been described. In actual implementations, modifications may be made. In order to handle measurement outliers so-called robust statistics like Huber losses and/or Cauchy weights may be used in Step 1 and Equations (6). This modification means that MAP and MLE estimates are not used, and the covariance estimation in Step 2 above as well as the hyperparameter estimation may require further modification to fit the theory. Additionally, in a SLAM system, there may not be access to the direct pixel measurements, but rather to their undistorted and normalized coordinates. When using the estimator or its robust counterpart in equation (5), it may be needed to map the available measurements and their associated uncertainties back to pixels via the distortion and unnormalization models.

Further Extensions

The coefficient vector $\gamma$ is treated as a variable from a pre-estimated and constant distribution. However this constantness restriction may be dropped, such that the estimate is refined by considering the joint distribution of c and $\gamma$. The modeled distribution of equation (3) for the measurements then becomes $$p(\hat{u}_{nm}) = \mathcal{M}(\hat{u}_{nm} \mid U(x_m, R_m, z_n; f(\delta_n; \delta_v, c, \gamma)), s\Sigma_{nm}^u)$$

and the recursive Bayesian estimation algorithm outlined above may be adjusted to refine the joint probability distribution of c and $\gamma$.

Various embodiments presented herein have described estimating a 3D map and poses based on 2D images. Specifically, solutions to improve the estimation of the 3D map by non-recursively performing initialization of the 3D map and recursively performing sequential updating of the 3D map have been described. Although the embodiments described herein have been in the context of a mobile camera, these techniques may be applied to other imaging systems such as security cameras, medical imaging, etc.

Further Definitions

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method for estimation of a Three-Dimensional, 3D, map and a plurality of poses from a series of Two-Dimensional, 2D, images, the method comprising:
  non-recursively performing an initialization of the 3D map and the respective poses of the plurality of poses based on a plurality of first 2D images of the series of 2D images;

recursively performing sequential updating of the 3D map based on recursively updating the 3D map for respective ones of a plurality of second 2D images of the series of 2D images;

non-recursively determining respective poses of the plurality of poses for respective ones of the plurality of second 2D images of the series of 2D images, wherein the series of 2D images comprises a first scan; and calibrating intrinsic parameters associated with a camera used to capture the plurality of first 2D images of the series of 2D images based on the plurality of first 2D images and a baseline of intrinsic parameters associated with a previous estimation that occurred before the first scan.

2. The method of claim 1, wherein a respective pose is associated with a respective one of the plurality of the first 2D images or with a respective one of the plurality of the second 2D images, and wherein a pose of the plurality of poses comprises an orientation and a position of capture of the respective one of the plurality of first 2D images or the plurality of second 2D images.

3. The method of claim 1, wherein the non-recursively performing the initialization of the 3D map further comprises:

selectively determining that a 2D image of the plurality of first 2D images is a key frame of a plurality of key frames.

4. The method of claim 3, wherein the selectively determining that the 2D image of the plurality of first 2D images is the key frame comprises:

determining that the 2D image of the plurality of first 2D images is the key frame, responsive to a change in a pose from another 2D image of the plurality of first 2D images being greater than a threshold.

5. The method of claim 3, wherein the non-recursively performing the initialization of the 3D map further comprises:

performing bundle adjustment on the plurality of key frames of the plurality of first 2D images of the series of 2D images to update the 3D map and to update the plurality of poses.

6. The method of claim 1, wherein the non-recursively performing the initialization of the 3D map comprises identifying one or more landmarks in the 3D map, and wherein the recursively performing sequential updating of the 3D map comprises recursively updating the 3D map based on the one or more landmarks that were identified during the non-recursively performing the initialization.

7. The method of claim 6, wherein the recursively updating the 3D map comprises updating existing 3D points in the 3D map and adding new 3D points to the 3D map based on the plurality of second 2D images.

8. The method of claim 1, wherein the series of 2D images comprises a first scan, the method further comprising:

recursively calibrating intrinsic parameters associated with a camera used to capture the plurality of second 2D images based on recursively estimating intrinsic parameters based on both the plurality of first 2D images and the plurality of second 2D images that are in the first scan.

9. The method of claim 8, wherein the recursively estimating intrinsic parameters comprises:

recursively Bayesian estimating the intrinsic parameters.

10. The method of claim 8, wherein a prior joint distribution of a set of 3D points in the 3D map and the plurality of poses comprises a uniform distribution, and wherein the recursively estimating intrinsic parameters comprises:

estimating a mean of the joint distribution of the set of 3D points in the 3D map and the plurality of poses and the intrinsic parameters;

estimating a covariance of the joint distribution of the set of 3D points in the 3D map and the plurality of poses and the intrinsic parameters; and deriving a distribution of the intrinsic parameters based on marginalizing the plurality of 3D points in the 3D map and the plurality of poses.

11. The method of claim 10, further comprising:

using the mean of the joint distribution as an estimate of second intrinsic parameters for estimation of the 3D map and the plurality of poses based on a second scan that occurs after the first scan.

12. An imaging system for processing images, the imaging system comprising:

a processor; and a memory coupled to the processor and storing computer readable program code that when executed by the processor causes the processor to perform operations comprising:

non-recursively performing an initialization of a Three-Dimensional, 3D, map and respective poses of a plurality of poses based on a plurality of first Two-Dimensional, 2D, images of a series of 2D images; and recursively performing sequential updating of the 3D map based on recursively updating the 3D map for respective ones of a plurality of second 2D images of the series of 2D images;

non-recursively determining respective poses of the plurality of poses for respective ones of the plurality of second 2D images of the series of 2D images, wherein the series of 2D images comprises a first scan; and calibrating intrinsic parameters associated with a camera used to capture the plurality of first 2D images of the series of 2D images based on the plurality of first 2D images and a baseline of intrinsic parameters associated with a previous estimation that occurred before the first scan.

13. The image processing system of claim 12, wherein the series of 2D images comprises a first scan, wherein the processor is further configured to perform operations comprising:

recursively calibrating intrinsic parameters associated with a camera used to capture the plurality of second 2D images based on recursively estimating intrinsic parameters based on both the plurality of first 2D images and the plurality of second 2D images that are in the first scan.

14. A method for estimation of a Three-Dimensional, 3D, map and a plurality of poses for a series of Two-Dimensional, 2D, images, wherein the series of 2D images comprises a first scan, the method comprising:

non-recursively performing an initialization of the 3D map and the respective poses of the plurality of poses based on a plurality of first 2D images of the series of 2D images;

recursively performing sequential updating of the 3D map based on recursively updating the 3D map for respective ones of a plurality of second 2D images of the series of 2D images; and recursively calibrating intrinsic parameters associated with a camera used to capture the plurality of second 2D images based on recursively estimating intrinsic parameters based on both the plurality of first 2D images and the plurality of second 2D images that are in the first scan.

* * * * *